US011506813B2

(12) United States Patent
Prochnow et al.

(10) Patent No.: US 11,506,813 B2
(45) Date of Patent: Nov. 22, 2022

(54) SYSTEMS AND METHODS FOR GENERATING SUBSURFACE FEATURE PREDICTION PROBABILITY DISTRIBUTIONS AS A FUNCTION OF POSITION IN A SUBSURFACE VOLUME OF INTEREST

(71) Applicant: CHEVRON U.S.A. INC., San Ramon, CA (US)

(72) Inventors: Shane J. Prochnow, Fulshear, TX (US); Patrick R K Brennan, Houston, TX (US); Amy C. Moss-Russell, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 368 days.

(21) Appl. No.: 16/774,914

(22) Filed: Jan. 28, 2020

(65) Prior Publication Data

US 2021/0231834 A1   Jul. 29, 2021

(51) Int. Cl.
*G01V 99/00* (2009.01)
*G06F 30/20* (2020.01)
(Continued)

(52) U.S. Cl.
CPC ............ *G01V 99/005* (2013.01); *G06F 30/20* (2020.01); *G06F 30/27* (2020.01); *E21B 2200/22* (2020.05); *G06F 2111/08* (2020.01)

(58) Field of Classification Search
CPC ....... G01V 99/005; G06F 30/20; G06F 30/27; G06F 2111/08; E21B 2200/22
(Continued)

(56) References Cited

U.S. PATENT DOCUMENTS 9,146,903 B2   9/2015   Thorne
9,201,164 B2   12/2015  Thorne
9,355,070 B2   5/2016   Thorne

FOREIGN PATENT DOCUMENTS

EP   3406844        11/2018
EP   3406844 A1 *  11/2018   ........... E21B 49/006
(Continued)

OTHER PUBLICATIONS

Bakay, Alexander, et al. "Integrating Geostatistical Modeling with Machine Learning for Production Forecast in Shale Reservoirs: Case Study from Eagle Ford." SPE/AAPG/SEG Unconventional Resources Technology Conference. OnePetro, 2019. p. 4370-4385. (Year: 2019).*

(Continued)

*Primary Examiner* — John E Johansen
(74) *Attorney, Agent, or Firm* — Sheppard, Mullin, Richter & Hampton LLP

(57) ABSTRACT

Systems and methods are disclosed for generating subsurface feature prediction probability distributions from a subsurface feature as a function of position in a subsurface volume of interest. For example, a computer-implemented method may include: obtaining subsurface data and well data, generating subsurface feature values, generating subsurface feature realizations, generating subsurface feature realization uncertainty values, generating subsurface parameter values, generating subsurface parameter realizations, generating subsurface feature prediction probability distributions, generating a first representation of likelihoods of the subsurface feature values, and displaying the first representation.

19 Claims, 13 Drawing Sheets

(51) Int. Cl.
G06F 30/27 (2020.01)
G06F 111/08 (2020.01)
(58) Field of Classification Search
USPC .......................................................... 703/10
See application file for complete search history.

(56) References Cited

FOREIGN PATENT DOCUMENTS

WO 2019/067213 A1 4/2019
WO 2019/067227 A1 4/2019

OTHER PUBLICATIONS

Singh, A. P., et al. "Uncertainty quantification of forecasted oil recovery using dynamic model ranking with application to a ME carbonate reservoir." International Petroleum Technology Conference. OnePetro, 2014. pp. 1-12 (Year: 2014).*

Sun, Wenyue, and Louis J. Durlofsky. "A new data-space inversion procedure for efficient uncertainty quantification in subsurface flow problems." Mathematical Geosciences 49.6 (2017). pp. 679-715. (Year: 2017).*

Glinsky M E et al: "Integration of uncertain subsurface information into multiple reservoir simulation models". pp. 990-999. (Year: 2005).*

Bakay et al., "Integrating Geostatistical Modeling with Machine Learning for Production Forecast in Share Reservoirs: Case Study from Eagle Ford," Unconventional Resources Technology Conference (URTeC), Jan. 1, 2019, 16 pages.

Glinsky et al., "Integration of uncertain subsurface information into multiple reservoir simulation models," The Leading Edge, Society of Exploration Geophysicists, US, Oct. 1, 2005, 8 pages.

Singh et al., "Uncertainty Quantification of Forecasted Oil Recovery using Dynamic Model Ranking with Application to a ME Carbonate Reservoir," International Petroleum Technology Conference, Jan. 1, 2014, 14 pages.

International Search Report and Written Opinion dated May 7, 2021 for International Application No. PCT/US2021/014908, filed Jan. 25, 2021.

Hadavand, M, et al; "Facies Proportion Uncertainty in the Presence of a Trend"; (2017), Journal of Petroleum Science and Engineering, vol. 153, pp. 59-69.

Hengl, T. Nussbaum, et al.; "Random Forest as a Generic Framework for Predictive Modeling of Spatial and Spatio-Temporal Variables"; (2018), PeerJ, vol. 6, e5518, DOI 10.7717/peerj.5518.

Journel, A.G.; "Resampling from Stochastic Simulations"; (1994), Environmental and Ecological Statistics, vol. 1, pp. 63-91.

Khan, K.D., et al.; "Practical Incorporation of Multivariate Parameter Uncertainty in Geostatistical Resource Modeling"; (2005), National Resources Research, pp. 1-20.

Solow, A.R.; "Boostraping Correlated Data"; (1985), vol. 17, p. 769-775.

* cited by examiner

SYSTEMS AND METHODS FOR GENERATING SUBSURFACE FEATURE PREDICTION PROBABILITY DISTRIBUTIONS AS A FUNCTION OF POSITION IN A SUBSURFACE VOLUME OF INTEREST

RELATED APPLICATIONS

The disclosures of "Systems And Methods For Estimating Reservoir Productivity As A Function of Position In A Subsurface Volume Of Interest" U.S. patent application Ser. No. 16/144,815, filed Sep. 27, 2018, "Systems And Methods For Estimating Refined Reservoir Productivity Values As A Function of Position In A Subsurface Volume Of Interest" U.S. patent application Ser. No. 16/576,698, filed Sep. 19, 2019, and "Systems and Methods For Predicting Hydrocarbon Production And Assessing Prediction Uncertainty" U.S. patent application Ser. No. 16/659,518, filed Oct. 21, 2019 are hereby incorporated by reference herein.

FIELD OF THE DISCLOSURE

The present disclosure relates to systems and methods for generating subsurface feature prediction probability distributions as a function of position in the subsurface volume of interest.

SUMMARY

Implementations of the disclosure are directed to systems and methods for generating subsurface feature prediction probability distributions from a subsurface feature as a function of position in a subsurface volume of interest. In implementations, a computer-implemented method may include a computer system. The computer system may include a physical computer processor, non-transient electronic storage, and a graphical user interface. In some implementations, a display may be used. The computer-implemented method may include obtaining subsurface data and well data. The computer-implemented method may also include generating subsurface feature values as a function of position in the subsurface volume of interest based on a subsurface feature relationship between the subsurface data and the well data. The computer-implemented method may further include generating subsurface feature realizations based on the subsurface feature values. The computer-implemented method may also include generating subsurface feature realization uncertainty values corresponding to the subsurface feature realizations. The subsurface feature realization uncertainty values may be based on the subsurface feature relationship. The computer-implemented method may further include generating subsurface parameter values indicating effects of subsurface parameters on individual ones of the subsurface feature values based on subsurface parameter relationships between the subsurface parameters and corresponding ones of the subsurface feature values. The computer-implemented method may also include generating subsurface parameter realizations based on the subsurface feature realizations and the subsurface parameter values. The computer-implemented method may further include generating subsurface parameter realization uncertainty values corresponding to the subsurface parameter realizations. The subsurface parameter realization uncertainty values may be based on the subsurface parameter relationships. The computer-implemented method may also include generating the subsurface feature prediction probability distributions as a function of position in the subsurface volume of interest based on at least one of the subsurface feature values, the subsurface feature realizations and corresponding ones of the subsurface feature realization uncertainty values, the subsurface parameter values, and the subsurface parameter realizations and corresponding ones of the subsurface parameter realization uncertainty values. The computer-implemented method may further include generating a first representation of likelihoods of the subsurface feature values as a function of position in the subsurface volume of interest using visual effects to display at least some of the subsurface feature prediction probability distributions as a function of position in the subsurface volume of interest. The computer-implemented method may further include displaying the first representation.

In implementations, the computer-implemented method may further include interpolating the subsurface feature values. The computer-implemented method may also include generating interpolation uncertainty values based on at least one interpolation error. The interpolation errors may be based based on interpolating the subsurface feature values. The computer-implemented method may further include generating interpolated subsurface feature prediction probability distributions as a function of position in the subsurface volume of interest based on at least one of the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values. The computer-implemented method may also include generating a second representation of the likelihoods of the subsurface feature values as a function of position in the subsurface volume of interest using visual effects to display at least some of the interpolated subsurface feature prediction probability distributions as a function of position in the subsurface volume of interest. The computer-implemented method may further include displaying the second representation.

In implementations, the subsurface feature may include estimated ultimate recovery. Estimated ultimate recovery values may be generated by applying decline analysis to the subsurface data and the well data.

In implementations, the subsurface feature realizations may include different statistical confidence levels based on the subsurface feature values. The subsurface parameter realizations may include different statistical confidence levels based on at least one of the subsurface feature values and individual ones of the subsurface feature realizations.

In implementations, the subsurface feature realizations may include P7, P10, P33, P50, P66, P90, and P95 based on the subsurface feature values. The subsurface parameter realizations may include P7, P10, P33, P50, P66, P90, and P95 for individual ones of the subsurface feature realizations based on the subsurface feature values.

In implementations, individual ones of the subsurface feature prediction probability distributions may specify likelihoods of the subsurface feature values as a function of position in the subsurface volume of interest.

In implementations, the subsurface feature relationship may include a decline analysis that estimates future production rates.

In implementations, the subsurface feature prediction probability distributions may be generated by performing a number of operations. One operation may include generating parameter matrices for the subsurface feature realizations by correlating the subsurface parameter realizations for individual ones of the subsurface parameters with corresponding positions in the subsurface volume of interest and corresponding ones of the subsurface feature realizations. An element in individual ones of the parameter matrices may include the subsurface parameter realizations for a subsurface parameter of the subsurface parameters. Another operation may include generating the subsurface feature prediction probability distributions based on at least one of the parameter matrices, the subsurface feature values, the subsurface feature realizations and corresponding ones of the subsurface feature realization uncertainty values, the subsurface parameter values, the subsurface parameter realizations and corresponding ones of the subsurface parameter realization uncertainty values.

In implementations, the computer-implemented method may further include weighting individual ones of the parameter matrices based on individual effects of the subsurface parameters on the subsurface feature.

In implementations, the subsurface parameter values may be generated by performing a number of operations. One operation may include obtaining the subsurface parameter relationships. The subsurface parameter relationships may have been conditioned by training initial subsurface parameter relationships using training well data and training subsurface parameter values. Yet another operation may include generating the subsurface parameter values by applying the subsurface parameter relationships to the subsurface data and the well data.

In yet another implementation, a system is disclosed. The system may include non-transient electronic storage and a physical computer processor configured by machine-readable instructions to perform a number of operations. One operation may include obtaining subsurface data and well data. Yet another operation may include generating subsurface feature values as a function of position in the subsurface volume of interest based on a subsurface feature relationship between the subsurface data and the well data. Another operation may include generating subsurface feature realizations based on the subsurface feature values. Yet another operation may include generating subsurface feature realization uncertainty values corresponding to the subsurface feature realizations. The subsurface feature realization uncertainty values may be based on the subsurface feature relationship. Another operation may include generating subsurface parameter values indicating effects of subsurface parameters on individual ones of the subsurface feature values based on subsurface parameter relationships between the subsurface parameters and corresponding ones of the subsurface feature values. Yet another operation may include generating subsurface parameter realizations based on at least one of the subsurface feature realizations and the subsurface parameter values. Another operation may include generating subsurface parameter realization uncertainty values corresponding to the subsurface parameter realizations. The subsurface parameter realization uncertainty values may be based on the subsurface parameter relationships. Yet another operation may include generating the subsurface feature prediction probability distributions as a function of position in the subsurface volume of interest based on at least one of the subsurface feature values, the subsurface feature realizations and corresponding ones of the subsurface feature realization uncertainty values, the subsurface parameter values, and the subsurface parameter realizations and corresponding ones of the subsurface parameter realization uncertainty values.

In implementations, the system may further include a display. The physical computer processor may be further configured by machine-readable instructions to perform a number of operations. One operation may include generating a first representation of likelihoods of the subsurface feature values as a function of position in the subsurface volume of interest using visual effects to display at least some of the subsurface feature prediction probability distributions as a function of position in the subsurface volume of interest. Yet another operation may include displaying the first representation.

In implementations, the physical computer processor may be further configured by machine-readable instructions to perform a number of operations. One operation may include interpolating the subsurface feature values. Another operation may include generating interpolation uncertainty values based on a sum of interpolation errors. The interpolation errors may be based on interpolating the subsurface feature values. Yet another operation may include generating interpolated subsurface feature prediction probability distributions as a function of position in the subsurface volume of interest based on at least one of the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values. Another operation may include generate a second representation of the likelihoods of the subsurface feature values as a function of position in the subsurface volume of interest using visual effects to display at least some of the interpolated subsurface feature prediction probability distributions as a function of position in the subsurface volume of interest. Yet another operation may include displaying the second representation.

In implementations, the subsurface feature realizations may include different statistical confidence levels based on the subsurface feature values. The subsurface parameter realizations may include different statistical confidence levels based on the subsurface feature values and individual ones of the subsurface feature realizations.

In implementations, the subsurface feature realizations may include P7, P10, P33, P50, P66, P90, and P95 based on the subsurface feature values. The subsurface parameter realizations may include P7, P10, P33, P50, P66, P90, and P95 for individual ones of the subsurface feature realizations based on the subsurface feature values.

In implementations, the subsurface feature prediction probability distributions may be generated by a number of operations. One operation may include generating parameter matrices for the subsurface feature realizations by correlating the subsurface parameter realizations for individual ones of the subsurface parameters with corresponding positions in the subsurface volume of interest and corresponding ones of the subsurface feature realizations. An element in individual ones of the parameter matrices may include the subsurface parameter realizations for a subsurface parameter of the subsurface parameters. Another operation may include generating the subsurface feature prediction probability distributions based on the parameter matrices, the subsurface feature values, the subsurface feature realizations and corresponding ones of the subsurface feature realization uncertainty values, the subsurface parameter values, the subsurface parameter realizations and corresponding ones of the subsurface parameter realization uncertainty values.

In implementations, the subsurface parameter values may be generated by obtaining the subsurface parameter relationships. The subsurface parameter relationships may have been conditioned by training initial subsurface parameter relationships using training well data and training subsurface parameter values. Another operation in generating the subsurface parameter values may include generating the subsurface parameter values by applying the subsurface parameter relationships to the subsurface data and the well data.

In yet another implementation, a non-transitory machine-readable storage media is disclosed. The non-transitory machine-readable storage media may store instructions that, when executed by a physical computer processor, may cause the physical computer processor to perform a number of operations. One operation may include obtaining subsurface data and well data. Another operation may include generating subsurface feature values as a function of position in the subsurface volume of interest based on a subsurface feature relationship between the subsurface data and the well data. Yet another operation may include generating subsurface feature realizations based on the subsurface feature values. Another operation may include generating subsurface feature realization uncertainty values corresponding to the subsurface feature realizations. The subsurface feature realization uncertainty values may be based on the subsurface feature relationship. Yet another operation may include generating subsurface parameter values indicating effects of subsurface parameters on individual ones of the subsurface feature values based on subsurface parameter relationships between the subsurface parameters and corresponding ones of the subsurface feature values. Another operation may include generating subsurface parameter realizations based on the subsurface feature realizations and the subsurface parameter values. Yet another operation may include generating subsurface parameter realization uncertainty values corresponding to the subsurface parameter realizations. The subsurface parameter realization uncertainty values may be based on the subsurface parameter relationships. Another operation may include generating the subsurface feature prediction probability distributions as a function of position in the subsurface volume of interest based on at least one of the subsurface feature values, the subsurface feature realizations and corresponding ones of the subsurface feature realization uncertainty values, the subsurface parameter values, and the subsurface parameter realizations and corresponding ones of the subsurface parameter realization uncertainty values. Yet another operation may include generating a first representation of likelihoods of the subsurface feature values as a function of position in the subsurface volume of interest using visual effects to display at least some of the subsurface feature prediction probability distributions as a function of position in the subsurface volume of interest. Another operation may include displaying the first representation.

In implementations, the non-transitory machine-readable storage media may store further instructions that, when executed by the physical computer processor, may cause the physical computer processor to perform a number of operations. One operation may include interpolating the subsurface feature values. Another operation may include generating interpolation uncertainty values based on a sum of interpolation errors. The interpolation errors may be based on interpolating the subsurface feature values. Yet another operation may include generating interpolated subsurface feature prediction probability distributions as a function of position in the subsurface volume of interest based on the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values. Another operation may include generating a second representation of the likelihoods of the subsurface feature values as a function of position in the subsurface volume of interest using visual effects to display at least some of the interpolated subsurface feature prediction probability distributions as a function of position in the subsurface volume of interest. Yet another operation may include displaying the second representation.

In implementations, the subsurface feature realizations may include P7, P10, P33, P50, P66, P90, and P95 based on the subsurface feature values. The subsurface parameter realizations may include P7, P10, P33, P50, P66, P90, and P95 for individual ones of the subsurface feature realizations based on the subsurface feature values.

These and other features and characteristics of the present technology, as well as the methods of operation and functions of the related elements of structure and the combination of parts, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the presently disclosed technology. As used in the specification and in the Claims, the singular form of "a", "an", and "the" include plural referents unless the context clearly dictates otherwise.

The technology disclosed herein, in accordance with various implementations, is described in detail with reference to the following figures. The drawings are provided for purposes of illustration and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and mechanical apparatuses may not be described in detail, so as not to unnecessarily obscure aspects of the implementations.

Existing approaches fail to account for varying sources of uncertainty in subsurface features. In particular, existing approaches cannot combine, or otherwise merge, the multiple sources of uncertainty to generate subsurface feature prediction probability distributions as a function of position in the subsurface volume of interest. Moreover, these approaches may ignore spatial locations of the observation data and any spatial autocorrelation in the data not accounted for by covariates. Many approaches assume statistical independence of randomly selected samples, even though some subsurface phenomena are significantly autocorrelated.

Subsurface data may be used to generate ranges of production values as a function of position in the subsurface volume of interest. The production values may include corresponding production uncertainties. The ranges of production values and corresponding uncertainties may be used to generate multiple realizations for individual ones of the ranges of production values. The ranges may be convoluted, or otherwise combined to generate a distribution of production values as a function of position in the subsurface volume of interest. It should be appreciated that other subsurface features may be used in this process as well, instead of production.

Disclosed below are methods, systems, and computer readable storage media that may generate subsurface feature prediction probability distributions as a function of position in the subsurface volume of interest. A subsurface volume of interest may include any area, region, and/or volume underneath a surface. Such a volume may include, or be bounded by, one of a water surface, a ground surface, and/or another surface.

Figure 1:
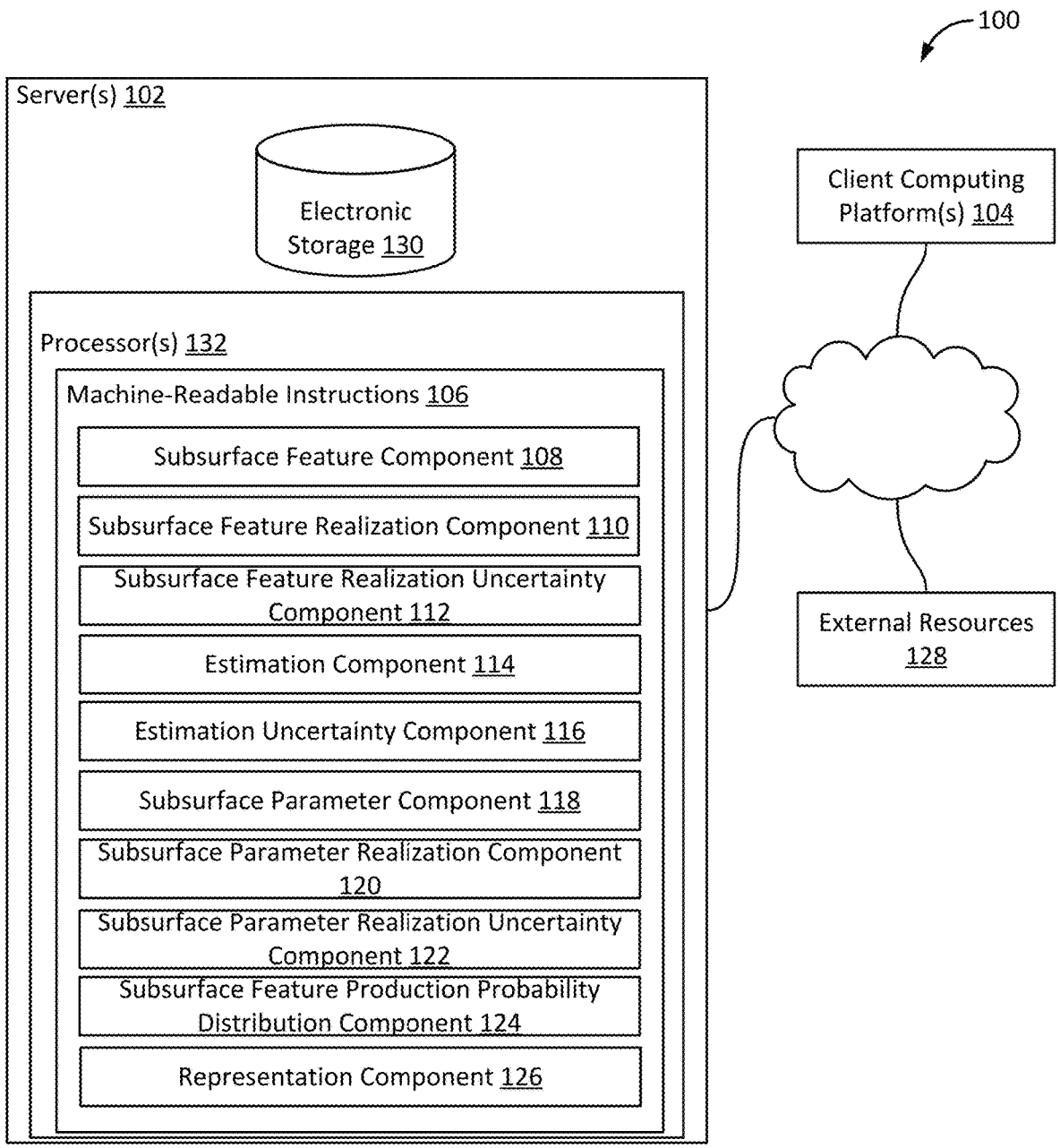
FIG. 1 shows a system configured for generating subsurface feature prediction probability distributions from a subsurface feature as a function of position in a subsurface volume of interest, in accordance with some implementations.

FIG. 1 illustrates a system 100 configured for generating subsurface feature prediction probability distributions from a subsurface feature as a function of position in a subsurface volume of interest, in accordance with some implementations. In implementations, system 100 may generate subsurface feature prediction probability distributions from a subsurface feature as a function of position in a subsurface volume of interest. In some implementations, system 100 may include a server 102. Server(s) 102 may be configured to communicate with a client computing platform 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include an instruction component. The instruction components may include computer program components. The instruction components may include one of a subsurface feature component 108, a subsurface feature realization component 110, a subsurface feature realization uncertainty component 112, an estimation component 114, an estimation uncertainty component 116, a subsurface parameter component 118, a subsurface parameter realization component 120, a subsurface parameter realization uncertainty component 122, a subsurface feature production probability distribution component 124, a representation component 126, and/or other instruction components.

Subsurface feature component 108 may be configured to obtain subsurface data and well data. The subsurface data and/or the well data may be obtained from the non-transient electronic storage and/or other sources. The subsurface data may include geological data. Geological data may specify information on rocks in the subsurface volume of interest. For example, geological data may include petrophysical, core, cutting, pressure, drilling property, mudlog, seismic properties, average porosity, pore saturation, mineralogy, lithofacies, geomechanical properties, organic richness, and/or other geological data. In implementations, for unconventional reservoirs, this may include an anticipated stimulated rock volume, a natural geologic target zone, or a gross formation interval. In some implementations, the geological data may be interpolated using cokriging, autocorrelation gridding techniques, and/or other techniques.

Well data may include engineering parameters and production data. Engineering parameters may specify characteristics of a well. For example, engineering parameters may include well perforation lengths, proppant intensity, fluid types, well spacing, number of frac stages, a completion size, a proppant parameter value, a fracture fluid parameter value, a well spacing parameter, a well pump rate parameter, a casing perforation parameter, a perforation cluster spacing parameter, a completion stage length parameter, and/or other engineering parameters. Engineering parameters may include parameters that otherwise relate to well design and/or completion design. Production data may include cumulative oil, gas, and/or water production.

In some implementations, subsurface feature component 108 may be configured to generate subsurface feature values as a function of position in the subsurface volume of interest. This may be accomplished by a physical computer processor. The subsurface feature may specify characteristics in the subsurface volume of interest. For example, the subsurface feature may include estimated ultimate recovery (EUR), hydrothermal energy, drilling metrics, rate of penetration, and/or another subsurface feature.

In implementations, the subsurface features may be spatially-correlated such that subsurface feature values may be similar within a spatial region. For example, values may be high within fifty miles of a first location and values may be low within 100 miles of a second location. It should be appreciated that different spatial ranges (e.g., 10 miles, 50 miles, 100 miles, 200 miles, and so on) may apply for different subsurface features.

The subsurface feature values may be generated based on subsurface feature relationships between the subsurface data and the well data. The subsurface feature relationships may be defined by one of a linear relationship, a non-linear relationship, and another relationship between the subsurface data and the well data. For example, the subsurface relationships may include a decline analysis that estimates future production rates. Examples of subsurface feature values may include one of production rates, particular production values at a given time, lithology classifications, porosity values, permeability values, and other subsurface feature values. The subsurface feature relationships may be generated using machine learning, geostatistics, regression analysis, and/or other techniques.

Subsurface feature realization component 110 may be configured to generate subsurface feature realizations. This may be accomplished by a physical computer processor. The subsurface feature realizations may specify subsurface feature values based on being a given subsurface feature value, being within a range of subsurface feature values, and/or being one of a group of discrete values. The subsurface feature realizations may be generated using the subsurface feature relationships. For example, a first subsurface feature realization may be generated for all of the productivity values that are at about 100 Mbbl (e.g., 99.5-100.4). A second subsurface feature realization may be generated for all of the productivity values that are at about 101 Mbbl (e.g., 100.5-101.4), and so on. In another example, a first subsurface feature realization may be generated for all of the productivity values that are at about 100 Mbbl (e.g., >90-100). A second subsurface feature realization may be generated for all of the productivity values that are at about 110 Mbbl (e.g., >100-110), and so on. In yet another example, a first subsurface feature realization may be generated for all of the productivity values that are at about 97 Mbbl (e.g., 99.5-100.4) and 104 Mbbl (e.g., 103.5-104.4). A second subsurface feature realization may be generated for all of the productivity values that are at about 112 Mbbl (e.g., 111.5-112.4), at about 116 Mbbl (e.g., 115.5-116.4), and at about 124 Mbbl (e.g., 123.5-124.4). It should be appreciated that the subsurface feature values may include the corresponding subsurface feature realization uncertainty values.

In implementations, the subsurface feature realizations may include different statistical confidence levels based on the subsurface feature values. Statistical confidence levels may indicate a probability that a modeled value will exceed a subsurface feature value. For example, the statistical confidence level may include different percentiles: P7, P10, P33, P50, P66, P90, and P95 based on the subsurface feature values. These statistical confidence levels can be generated by determining what percentile of subsurface feature values are statistically likely to be above or below a corresponding subsurface feature value. Referring back to the P7 example, P7 may refer to there being a 7% probability that an actual subsurface feature value will be below or equal to the corresponding subsurface feature value for P7. P10 may refer to there being a 10% probability that an actual subsurface feature value will be below or equal to the corresponding subsurface feature value for P10, and so on. While P7, P10, P33, P50, P66, P90, and P95 are listed as examples, it should be appreciated that finer or coarser levels may be used for different applications that require more or less precision. It should be appreciated that subsurface feature relationships may be defined for each percentile value.

Subsurface feature realization uncertainty component 112 may be configured to generate subsurface feature realization uncertainty values corresponding to the subsurface feature realizations. This may be accomplished by a physical computer processor. The subsurface feature realization uncertainty values may be based on the subsurface feature relationships to generate the subsurface feature realizations. In other words, the subsurface feature relationships may be a source of the subsurface feature realization uncertainty values. For example, near subsurface feature relationships may not accurately fit every subsurface feature value on the subsurface feature realizations, and this inaccuracy, or uncertainty, may be measured to generate the subsurface feature realization uncertainty values. The subsurface feature realization uncertainty values may provide a range of values corresponding to subsurface feature realizations. The uncertainty of the subsurface feature relationships may be reflected in ratios of the subsurface feature realizations (e.g., P90/P10, P10/P90, and other ratios)

Estimation component 114 may be configured to estimate additional subsurface feature values. This may be accomplished by a physical computer processor. In implementations, the subsurface feature values may be located at control points where subsurface data and/or well data may have been collected. Estimating additional subsurface feature values may leverage the spatial-correlation of the subsurface feature values derived from the subsurface data and the well data. For example, the estimation may include one of interpolation and extrapolation. It should be appreciated that other techniques may be used to estimate the additional subsurface feature values.

In some implementations, estimation component 114 may be configured to estimate trends of well data using geostatistical tools such as kriging, inverse distance weighting (IDW), autocorrelation gridding techniques, bicubic interpolating functions, and/or other techniques to generate a set of geological parameters. This may be accomplished by a physical computer processor. A trend estimation algorithm and a trend estimation uncertainty algorithm may be used to assess trend and variance of poorly characterized or indeterminate geologic parameters. The trend estimation algorithm may include an expected trend value of the geological parameters and the trend estimation uncertainty algorithm may include a statistical uncertainty of geological parameters. For example, the expected trend value and statistical uncertainty of porosity, silica content, and carbonate content that can be interpolated from measured geologic parameter data to the collated spatial location of the production data.

The trend estimation algorithm can be based on a generalized least-square inversion using the equation $d^{obs}=Gm^{est}$ where $d^{obs}$ may represent the measured geologic parameter data, G may represent a matrix containing the equations for the estimate of each gridded model location as a distance weighted sum of nearby data, and $m^{est}$ may represent the estimated inversion model (i.e., the trend values at gridded locations). The trend estimation uncertainty algorithm can be based on statistical measures of P-value, residual and total variance, F-test ration, and $N_{eff}$ that can be determined during the generalized least-square inversion.

In some implementations, an initial production model may be conditioned to generate a trained production model using training data. The initial production model may include a deterministic random forest, probabilistic random forest, and/or another machine learning technique. The training data may include well data, engineering parameters, geological parameters, and geological parameter uncertainty values corresponding to a subsurface volume of interest. The training data may also include well data. Trends and response variable uncertainty may be parametrized through P-value, residual and total variance, F-test ratio, and $N_{\mathit{eff}}$ can be jointly estimated from training data. The trained production model may include a deterministic random forest, probabilistic random forest, and/or another machine learning technique. The trained production model may be able to predict hydrocarbon production and the corresponding predicted hydrocarbon production uncertainty by recognizing patterns in the training data.

In some implementations, estimation uncertainty component 116 may be configured to generate estimation uncertainty values. This may be accomplished by a physical computer processor. The estimation uncertainty values may be generated based on estimation errors. The estimation errors may include one of a kriging standard error, a mean squared error, a root mean square error, a sum of squared errors, sum of absolute errors, average standard error, mean standardized error, and other techniques to estimate the errors. For example, a source of the estimation errors may be from one of interpolation, extrapolation, regression, modeling, and other techniques applied to the subsurface data and/or well data.

In some implementations, the estimation uncertainty values may include a predicted uncertainty or statistical uncertainty of the subsurface feature values. The estimation uncertainty values can describe property uncertainty that arises from various sources. For example, poor determination of the local trend, high spatial heterogeneity, erroneous measurements, and regression itself (i.e., standard error) can be sources of property uncertainty. Production and engineering data can be measured directly at the producing wells and have significantly less uncertainty then the trend data which may be inferred from other non-producing wells.

Subsurface parameter component 118 may be configured to identify target subsurface parameters. This may be accomplished by a physical computer processor. The target subsurface parameters may affect the subsurface feature values. In implementations, the target subsurface parameters may include the top five most statistically significant subsurface parameters. These might be the five with the greatest impact on the subsurface feature values (i.e., changes in the values of these five subsurface parameters have the greatest impact on the subsurface feature values compared to other subsurface parameters). It should be appreciated that more or less subsurface parameters may be included or that a threshold may be used (e.g., changing 1 unit for the subsurface parameter may have an impact of 2 or more units for the subsurface feature value or other values).

In implementations, a set of subsurface parameters may correspond to a subsurface feature value. The set of subsurface parameters may have an impact over a threshold value compared to other subsurface parameters for the subsurface feature values. For example, for 100 Mbbl of productivity, the corresponding subsurface parameters may be different than the subsurface parameters for 60 Mbbl. In some examples, even if the subsurface parameters for 100 Mbbl and 60 Mbbl are the same, the subsurface parameter values for each productivity value may be different.

The subsurface parameters may include engineering parameters, petrophysical rock properties, reservoir fluid properties, reservoir conditions, and other subsurface properties and characteristics that can affect the subsurface feature. For example, the subsurface parameters may include temperature, porosity, permeability, water composition, mineralogy, hydrocarbon type, hydrocarbon quantity, reservoir location, pressure, log formation thickness, lithology, net-to-gross, compressibility, and the like. Those of ordinary skill in the art will appreciate that there are many other types of subsurface parameters, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, a methane hydrate containing subsurface volume of interest, a mineral containing subsurface volume of interest, a metal containing subsurface volume of interest, a subsurface volume of interest having a permeability in the range of 0.01 microdarcy to 10 millidarcy, and a subsurface volume of interest having a permeability in the range of 10 millidarcy to 40,000 millidarcy. It should be appreciated that the above list is merely an example and other subsurface parameters may be relevant.

The subsurface parameters may be identified based on subsurface parameter relationships between the subsurface parameters and corresponding ones of the subsurface feature values. The subsurface parameter relationships may be defined by one of a linear relationship, a non-linear relationship, and another relationship between the subsurface parameters and the subsurface feature. The subsurface parameter relationships may be generated using machine learning (e.g., random forest, decision trees, neural networks, regression, and the like), analysis of well data, analysis of subsurface data, analysis of subsurface parameters and subsurface features, and/or other techniques. For example, the subsurface relationships may include an equation that estimates an oil productivity based on a porosity, permeability, and pressure in a given location in the subsurface volume of interest. In another example, the subsurface relationship may include a drilling rate of penetration related to rock lithology, natural fracture density, and pore water saturation. It should be appreciated that other subsurface parameters may be used in lieu of, or in addition to those listed in the example above, depending on the subsurface parameter relationships and the target subsurface feature.

In implementations, the subsurface parameter relationships may weight individual parameters differently such that individual parameters have different effects on the subsurface feature value. For example, the subsurface parameter relationships may be defined by temperature, permeability, and lithology to estimate a productivity. The temperature values may be weighted by 0.5, the permeability values may be weighted by 0.3, and the lithology values may be weighted by 0.2.

In some implementations, subsurface parameter component 118 may be configured to obtain the subsurface parameter relationships. The subsurface parameter relationships may be obtained from the non-transient electronic storage and/or other sources. The subsurface parameter relationships may be generated by training initial subsurface parameter relationships using training well data and training subsurface parameter values. The subsurface parameter relationships may include random forest machine learning, neural networks, and/or other machine learning.

In one example, the subsurface parameter relationships may include random forest machine learning. Random forest may be a modification of bootstrap aggregation that builds on a large collection of de-correlated regression trees and then averages them. Bootstrap aggregation may average many noisy but unbiased models to reduce prediction variance. The random forest machine learning may use many boot strap sets and many regression trees to generate many predictions, ultimately averaged together to provide the final prediction algorithm. The final prediction algorithm may identify the most impactful and statistically significant predictor subsurface parameters that account for differences in subsurface feature values, as described above. Applying the subsurface parameter relationships to the target subsurface parameter maps may allow for validation of the analytic model via blind testing.

In some implementations, subsurface parameter component 118 may be configured to identify target subsurface parameters by applying the subsurface parameter relationships to the well data. This may be accomplished by a physical computer processor. For example, the subsurface parameter relationships may receive as input the well data and output target subsurface parameters.

Subsurface parameter component 118 may be configured to use the subsurface data and the well data to generate subsurface parameter maps. This may be accomplished by a physical computer processor. A given subsurface parameter map may represent the subsurface parameter values for a given subsurface parameter as a function of time and position in the subsurface volume of interest. In implementations, subsurface parameter values may be filtered based on statistical significance and/or collinearity using, for example, a Pearson correlation matrix.

Subsurface parameter component 118 may be configured to apply the subsurface parameter relationships to the subsurface parameter maps to generate target subsurface parameters including target subsurface parameter values. This may be accomplished by the physical computer processor. The target subsurface parameters may be a subset of the subsurface parameters. The subsurface parameter relationships may have been trained, as described herein, to identify one of the subsurface parameters that have the greatest effect on productivity compared to the other subsurface parameters.

In implementations, a Boruta plot may be generated from the random forest model using the target subsurface parameters and corresponding target subsurface parameter values.

Subsurface parameter component 118 may be configured to generate target subsurface parameter graphs from the target subsurface parameter values. A given target subsurface parameter graph may specify the target subsurface parameter values for a corresponding subsurface parameter as a function of estimated reservoir productivity. This may be accomplished by the physical computer processor.

Subsurface parameter component 118 may be configured to display the target subsurface parameter graphs. The target subsurface parameter graphs may be displayed on a graphical user interface and/or other displays.

Subsurface parameter component 118 may be configured to determine or identify trends, thresholds, and/or other conditions to limit the target subsurface parameter values using linear analysis, non-linear analysis, rate of change analysis, machine learning, and/or other techniques. This may be accomplished by a physical computer processor.

Subsurface parameter realization component 120 may be configured to generate subsurface parameter realizations. This may be accomplished by a physical computer processor. The subsurface parameter realizations may be substantially similar to the subsurface feature realizations. The subsurface parameter realizations may specify parameterized subsurface feature values. The parameterized subsurface feature values may be based on individual ones of the subsurface feature realizations. For example, a first set of subsurface parameter realizations may include a P7, P10, P33, P50, P66, P90, and P95 of a P10 subsurface feature realization. A second set of subsurface parameter realizations may include a P7, P10, P33, P50, P66, P90, and P95 of a P50 subsurface feature realization, and so on.

The subsurface parameter realizations may be based on the subsurface feature realizations. The subsurface parameter realizations may include different statistical confidence levels. The different statistical confidence levels may be based on the subsurface feature values and individual ones of the subsurface feature realizations. For example, the subsurface parameter realizations may include P7, P10, P33, P50, P66, P90, and P95 for individual ones of the subsurface feature realizations based on the subsurface feature values, as described above. It should be appreciated that each subsurface parameter realization may include a different set of subsurface parameters and corresponding subsurface parameter values and that each subsurface parameter realization may be defined by a different subsurface parameter relationship.

Subsurface parameter realization uncertainty component 122 may be configured to generate subsurface parameter realization uncertainty values corresponding to the subsurface parameter relationships and corresponding target subsurface parameters. This may be accomplished by a physical computer processor. The subsurface parameter realization uncertainty values may be based on the subsurface parameter relationships. For example, the subsurface parameter relationships may be generated based on machine learning, analysis of the subsurface parameters and the subsurface feature, and other techniques as discussed above. The subsurface parameter relationships may be fitted to the subsurface parameters and corresponding subsurface feature, thereby generating subsurface parameter realization uncertainty. In implementations, the subsurface parameter realization uncertainty may be derived from uncertainty of the effects of individual ones of the subsurface parameters on the subsurface feature. In some implementations, the spatially-correlated subsurface parameter realization uncertainty values may be derived from the intrinsic error of fitting the subsurface parameter relationships to the subsurface parameters and subsurface feature, as well as the effect of target subsurface parameters on the subsurface feature values.

Subsurface feature production probability distribution component 124 may be configured to generate the subsurface feature prediction probability distributions as a function of position in the subsurface volume of interest. This may be accomplished by a physical computer processor. The subsurface feature production probability distributions may include a distribution of subsurface feature values as a function of position. The subsurface feature production probability distributions may be derived from one of the subsurface feature realizations and the subsurface parameter realizations. For example, for a first position, there may be 2000 subsurface feature values forming a distribution: 500 subsurface feature values may be 100 Mbbl; 1000 subsurface feature values may be 80 Mbbl; 200 subsurface feature values may be 130 Mbbl; 200 subsurface feature values may be 160 Mbbl; and 100 subsurface feature values may be 88 Mbbl. A second position may also have 2000 subsurface feature values forming a distribution: 100 subsurface feature values may be 40 Mbbl; 1200 subsurface feature values may be 20 Mbbl; 300 subsurface feature values may be 60 Mbbl; 200 subsurface feature values may be 30 Mbbl; and 200 subsurface feature values may be 10 Mbbl.

The subsurface feature prediction probability distributions may be based on the subsurface feature values, subsurface feature realizations and corresponding ones of the subsurface feature realization uncertainty values, the subsurface parameter values, and the subsurface parameter realizations and corresponding ones of the subsurface parameter realization uncertainty values. In implementations, the subsurface feature prediction probability distributions may be based on the subsurface parameter realizations and estimations.

In one example, the subsurface feature prediction probability distribution may be generated by generating parameter matrices. In some implementations, the parameter matrices may be based on the subsurface parameter realizations. For example, individual ones of the subsurface parameters may be correlated with corresponding positions in the subsurface volume of interest and corresponding ones of the subsurface feature realizations. The parameter matrices may include subsurface parameter realizations in individual elements of a parameter matrix. For example, a first element of a first parameter matrix may include P7, P10, P33, P50, P66, P90, and P95 values of porosity for P10 for productivity at a first position in the subsurface volume of interest. The second element of the parameter matrix may include P7, P10, P33, P50, P66, P90, and P95 values of permeability for P10 for productivity at the first position in the subsurface volume of interest, and so on. A second parameter matrix may be substantially similar to the first matrix and be for a second position in the subsurface volume of interest and a second realization value.

In implementations, individual elements of the parameter matrices may be weighted based on effects individual ones of the subsurface parameters have on the subsurface feature which may be used to generate the subsurface feature values. In other words, the subsurface parameter relationships that was used to generate subsurface parameter realizations may be used to inform the weights to apply to the subsurface parameters. In some implementations, individual parameter matrices may be weighted based on the weighted subsurface parameter of a corresponding target subsurface parameter, and interpolation standard error to form an estimated local geologic interpolation error. For each weighted subsurface parameter, there may be an associated interpolation error.

In implementations, the parameter matrices may be re-ranked and/or organized to reevaluate the subsurface feature realizations and subsurface parameter realizations and corresponding subsurface feature values that are included in the subsurface feature realizations and subsurface parameter realizations. In some implementations, the re-ranked and/or organized parameter matrices may be used to apply regression, machine learning, and/or other techniques to estimate probabilistic relationships between the subsurface parameter values.

Individual ones of the subsurface feature prediction probability distributions may specify likelihoods of the subsurface feature values as a function of position in the subsurface volume of interest. For example, the distribution may be a bell curve. The region under the center of the bell curve may be more likely than the region under the edges of the bell curve.

In some implementations, subsurface feature production probability distribution component 124 may be configured to generate estimated subsurface feature prediction probability distributions as a function of position in the subsurface volume of interest. This may be accomplished by a physical computer processor. The estimated subsurface feature prediction probability distributions may include interpolated values, extrapolated values, or otherwise estimated values. The estimation may be based on the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the estimation uncertainty values. The estimation may leverage spatial correlation as described above. The estimation may be substantially similar to the estimation discussed with respect to estimation component 114.

Representation component 126 may be configured to generate a first representation of likelihoods of the subsurface feature values as a function of position in the subsurface volume of interest using visual effects to display at least some of the subsurface feature prediction probability distributions as a function of position in the subsurface volume of interest. This may be accomplished by a physical computer processor. In some implementations, a visual effect may include a visual transformation of the representation. A visual transformation may include a visual change in how the representation is presented or displayed. In some implementations, a visual transformation may include one of a visual zoom, a visual filter, a visual rotation, and/or a visual overlay (e.g., text and/or graphics overlay). The visual effect may include using a temperature map, or other color coding, to indicate which positions in the subsurface volume of interest have higher or lower values.

In some implementations, representation component 126 may be configured to display the first representation. The first representation may be displayed on a graphical user interface and/or other displays.

In implementations, representation component 126 may be configured to generate a second representation of the likelihoods of the subsurface feature values as a function of position in the subsurface volume of interest using visual effects to display at least some of the estimated subsurface feature prediction probability distributions as a function of position in the subsurface volume of interest. This may be accomplished by a physical computer processor.

In some implementations, representation component 128 may be configured to display the second representation. The first representation may be displayed on a graphical user interface and/or other displays.

In implementations, representation component 128 may be configured to generate a third representation of a ratio of realizations as a function of position in the subsurface volume of interest using visual effects to display at least some of the subsurface parameter realizations as a function of position in the subsurface volume of interest. This may be accomplished by a physical computer processor. For example, the ratio of realizations may be a P90/P10 ratio indicating an uncertainty. The P90/P10 ratio may be transformed using an arcsine transformation to accentuate the extremes of the P90/P10 ratio values.

In some implementations, representation component 128 may be configured to display the third representation. The third representation may be displayed on a graphical user interface and/or other displays.

In implementations, the representations may be used to quickly test an effectiveness of the subsurface feature relationships and the subsurface parameter relationships based on a displayed uncertainty. Values that over a threshold range (e.g., greater than 1.5, 1.6, 1.7, 1.8, 1.9, 2.0, and so on) This may include removing subsurface data from the training data, re-training the subsurface feature relationships and the subsurface parameter relationships, or gathering more subsurface data and well data.

In some implementations, server(s) 102, client computing platform(s) 104, and/or external resources 128 may be operatively linked via an electronic communication link. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include a processor configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, a processors 134, and/or another component. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transient electronic storage and/or non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include a virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one of a physical computer processor, a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, and/or other components. Processor(s) 132 may be configured to execute components 108, 110, 112, 114, 116, 118, 120, 122, 124, 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As an example, processor(s) 132 may be configured to execute an additional component that may perform some or all of the functionality attributed below to one of components 108, 110, 112, 114, 116, 118, 120, 122, 124, and/or 126.

Figure 2:
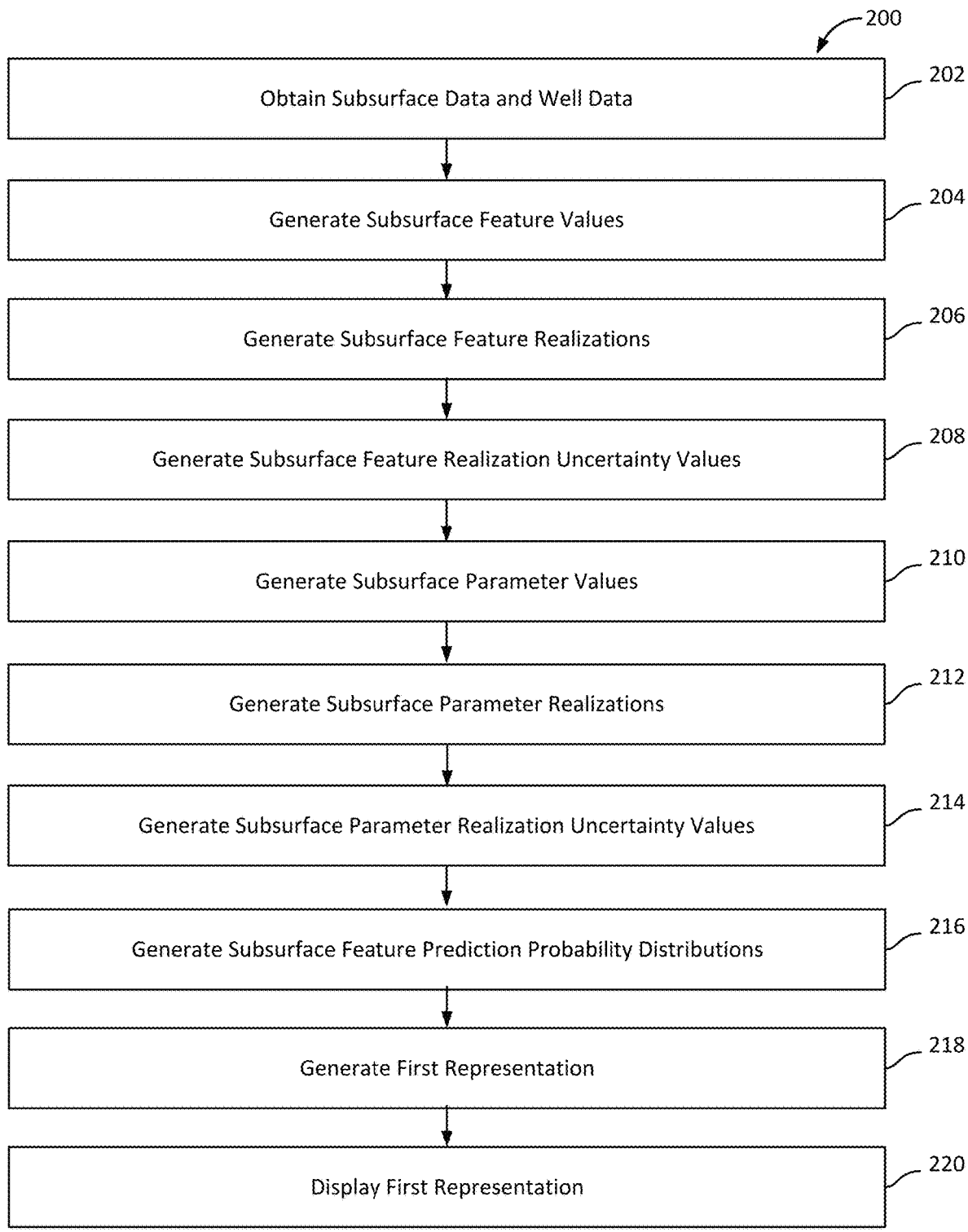
FIG. 2 is a flowchart of a method of generating subsurface feature prediction probability distributions from a subsurface feature as a function of position in a subsurface volume of interest, in accordance with some implementations.

FIG. 2 illustrates a method 200 for generating subsurface feature prediction probability distribution as a function of position in a subsurface volume of interest, in accordance with some implementations. The operations of method 200 presented below is intended to be illustrative. In some implementations, method 200 may be accomplished with an additional operation not described, and/or without one of the operations discussed. Additionally, the order in which the operations of method 200 is illustrated in FIG. 2 and described below is not intended to be limiting.

In some implementations, method 200 may be implemented in a processing device (e.g., a digital processor, a physical computer processor, an analog processor, a digital circuit designed to process information, an analog circuit designed to process information, a state machine, and/or other mechanisms for electronically processing information). The processing device may include a device executing some or all of the operations of method 200 in response to instructions stored electronically on an electronic storage medium. The processing device may include a device configured through hardware, firmware, and/or software to be specifically designed for execution of one of the operations of method 200.

An operation 202 may include obtaining subsurface data and well data. Operation 202 may be performed by a hardware processor configured by machine-readable instructions including a component that is the same as or similar to subsurface feature component 108, in accordance with some implementations.

An operation 204 may include generating subsurface feature values as a function of position in the subsurface volume of interest. The subsurface feature values may be based on subsurface feature relationships between the subsurface data and the well data. In implementations, the subsurface feature relationship may include a decline analysis that estimates future production rates. In some implementations, the subsurface feature may include an estimated ultimate recovery. The estimated ultimate recovery values may be generated by applying decline analysis to the subsurface data and the well data. Operation 204 may be performed by a hardware processor configured by machine-readable instructions including a component that is the same as or similar to subsurface feature component 108, in accordance with some implementations.

An operation 206 may include generating subsurface feature realizations. The subsurface feature realizations may be based on the subsurface feature values. In some implementations, the subsurface feature realizations may include different statistical confidence levels based on the subsurface feature values. In implementations, the subsurface feature realizations may include P7, P10, P33, P50, P66, P90, and P95 based on the subsurface feature values. Operation 206 may be performed by a hardware processor configured by machine-readable instructions including a component that is the same as or similar to subsurface feature realization component 110, in accordance with some implementations.

An operation 208 may include generating subsurface feature realization uncertainty values. The subsurface feature realization uncertainty values may correspond to the subsurface feature realization. The subsurface feature realization may be based on the subsurface feature relationship. Operation 208 may be performed by a hardware processor configured by machine-readable instructions including a component that is the same as or similar to subsurface feature realization uncertainty component 110, in accordance with some implementations.

An operation 210 may include generating subsurface parameter values. The subsurface parameter values may indicate effects of subsurface parameters on individual ones of the subsurface feature values. The subsurface parameter values may be based on subsurface parameter relationships between the subsurface parameters and corresponding ones of the subsurface feature values. In some implementations, the subsurface parameter relationships may be generated by training initial subsurface parameter relationships using training well data and training subsurface parameter values. The subsurface parameter relationships may include random forest machine learning, neural networks, and/or other machine learning. Operation 210 may be performed by a hardware processor configured by machine-readable instructions including a component that is the same as or similar to subsurface parameter component 118, in accordance with some implementations.

An operation 212 may include generating subsurface parameter realizations. The subsurface parameter realizations may be based on the subsurface feature realizations. In some implementations, the subsurface parameter realizations may include different statistical confidence levels based on the subsurface feature values and individual ones of the subsurface feature realizations. In implementations, the subsurface parameter realizations may include P7, P10, P33, P50, P66, P90, and P95 for individual ones of the subsurface feature realizations. Operation 212 may be performed by a hardware processor configured by machine-readable instructions including a component that is the same as or similar to subsurface parameter realization component 120, in accordance with some implementations.

An operation 214 may include generating subsurface parameter realization uncertainty values. The subsurface parameter realization uncertainty values may correspond to the subsurface parameter realizations. The subsurface parameter realization uncertainty values may be based on the subsurface parameter relationships. Operation 214 may be performed by a hardware processor configured by machine-readable instructions including a component that is the same as or similar to subsurface parameter realization uncertainty component 122, in accordance with some implementations.

In some implementations, probabilistic relationships between the subsurface feature realizations and corresponding ones of the subsurface feature realization uncertainty values and the subsurface parameter realizations and corresponding ones of the subsurface parameter realization uncertainty values may be estimated.

An operation 216 may include generating the subsurface feature prediction probability distributions as a function of position in the subsurface volume of interest. The subsurface feature prediction probability distributions may be based on one of the subsurface feature values, the subsurface feature realizations and corresponding ones of the subsurface feature realization uncertainty values, the subsurface parameter values, and the subsurface parameter realizations and corresponding ones of the subsurface parameter realization uncertainty values. In implementations, individual ones of the subsurface feature prediction probability distributions may specify likelihoods of the subsurface feature values as a function of position in the subsurface volume of interest.

In some implementations, the subsurface feature prediction probability distributions may be generated by performing at least one step. One step may include generating parameter matrices for the subsurface feature realizations by correlating the subsurface parameter realizations for individual ones of the subsurface parameters with corresponding positions in the subsurface volume of interest and corresponding ones of the subsurface feature realizations. An element in individual ones of the parameter matrices may include the subsurface parameter realizations for a subsurface parameter. One step may include generating the subsurface feature prediction probability distributions based on one of the parameter matrices, the subsurface feature values, the subsurface feature realizations and corresponding ones of the subsurface feature realization uncertainty values, the subsurface parameter values, the subsurface parameter realizations and corresponding ones of the subsurface parameter realization uncertainty values. In some implementations, individual ones of the parameter matrices may be weighted based on individual effects of the subsurface parameters on the subsurface feature. Operation 216 may be performed by a hardware processor configured by machine-readable instructions including a component that is the same as or similar to subsurface feature prediction probability distribution component 124, in accordance with some implementations.

An operation 218 may include generating a first representation of likelihoods of the subsurface feature values as a function of position in the subsurface volume of interest. The first representation may be generated using visual effects to display at least some of the subsurface feature prediction probability distributions as a function of position in the subsurface volume of interest. Operation 218 may be performed by a hardware processor configured by machine-readable instructions including a component that is the same as or similar to representation component 126, in accordance with some implementations.

In some implementations, interpolated, or otherwise estimated subsurface feature values, subsurface feature realizations, subsurface parameter values, and subsurface parameter realizations may be used to generate a second representation.

In implementations, a ratio of realizations may be generated by comparing a first realization to a second realization. For example, this may include a P90/P10 ratio, as better illustrated in FIGS. 10, 11, and 13.

An operation 220 may include displaying the first representation. Operation 220 may be performed by a hardware processor configured by machine-readable instructions including a component that is the same as or similar to representation component 126, in accordance with some implementations.

In implementations, the subsurface feature values, the subsurface feature realizations, the subsurface parameter values, and the subsurface parameter realizations may be interpolated, extrapolated, or otherwise estimated away from control points. This may be performed by a hardware processor configured by machine-readable instructions including a component that is the same as or similar to estimation component 114, in accordance with some implementations.

The interpolation, extrapolation, or estimation may generate a corresponding estimation uncertainty. This may be performed by a hardware processor configured by machine-readable instructions including a component that is the same as or similar to estimation uncertainty component 116, in accordance with some implementations.

Figure 3:
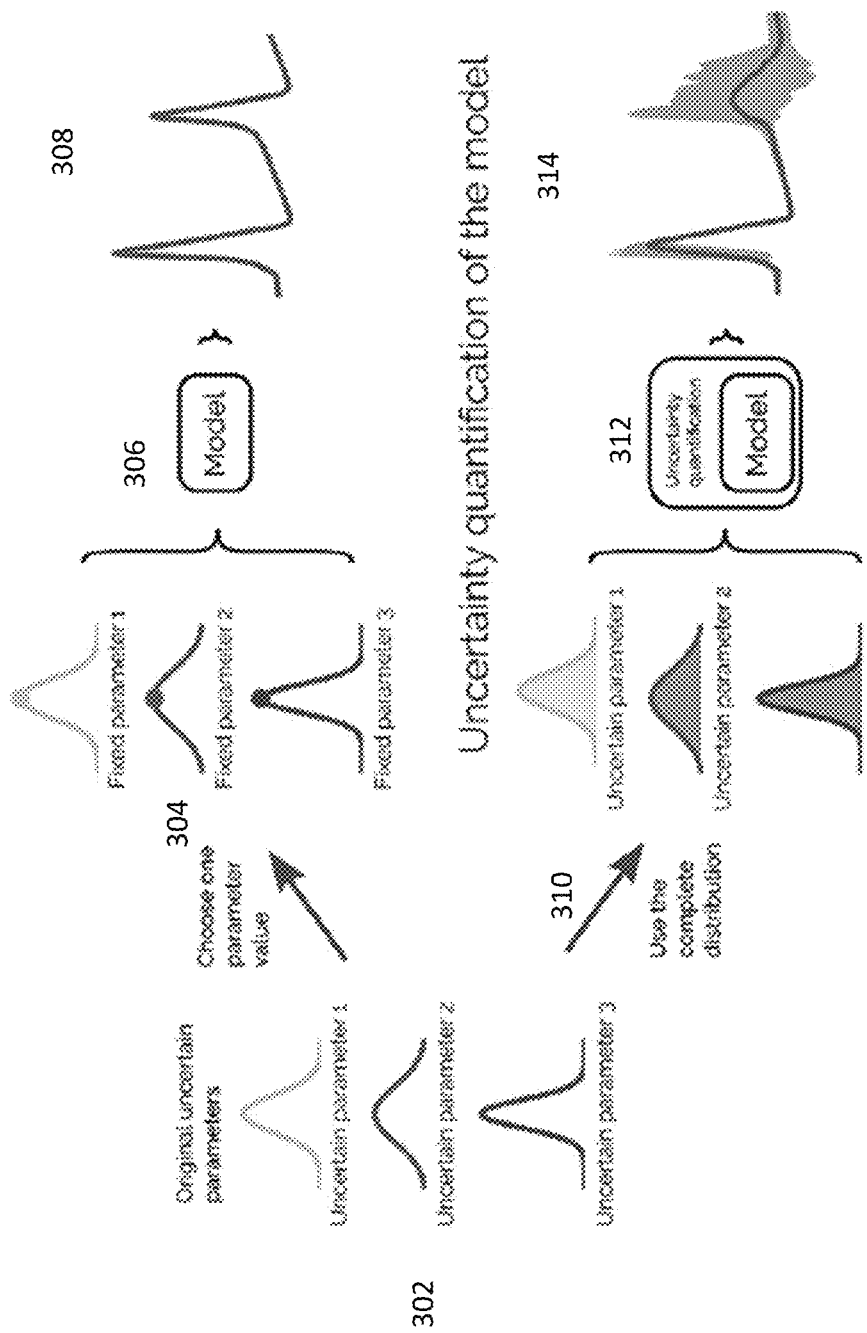
FIG. 3 illustrates example sources of uncertainty for models, in accordance with some implementations.

FIG. 3 illustrates sources of uncertainty. Parameters 302 may have an associated uncertainty. In implementations, a fixed value of the parameter may be selected at 304. The fixed parameter 304 may be input into model 306 to generate a curve 308 based on the model 306. While curve 308 is precise, curve 308 does not reveal the uncertainty behind inherent in parameters 302. In some implementations, complete distribution 310 of parameters may be used as input for model 312 to generate curve 314 with corresponding uncertainty.

Figure 4:
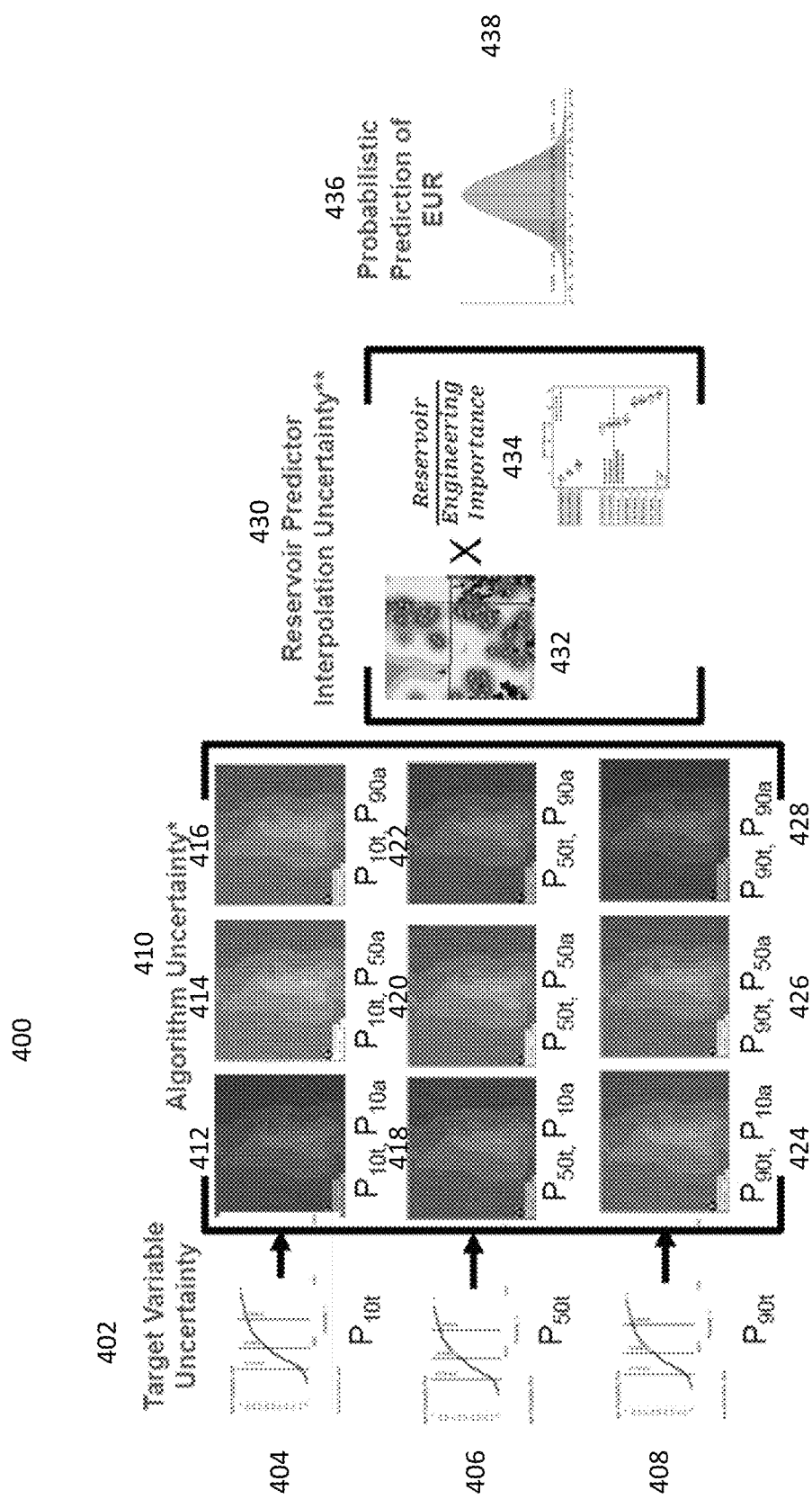
FIG. 4 is an example workflow for generating estimated ultimate recovery (EUR) prediction probability distributions, in accordance with some implementations.

FIG. 4 illustrates an example workflow for generating estimated ultimate recovery (EUR) prediction probability distributions, in accordance with some implementations. 402 may illustrate incorporating the target variable uncertainty into a probabilistic prediction of the subsurface feature values. For example, subsurface data and well data may be used to estimate a productivity as a function of position. This estimate may include an uncertainty based on a given realization (e.g., P10, P40, and P90). 404 may correspond to P10t. 406 may correspond to P40t. 408 may correspond to P90t. Each of these realizations may have a corresponding uncertainty tied to the percentile value.

410 may illustrate how the algorithm uncertainty is incorporated into a probabilistic prediction of the subsurface feature values. 412 may correspond to taking a P10 of the P10t. In other words, the 10t may represent that 10 percent of the values may be below the corresponding value, and the P10a of the P10t may represent that 10 percent of the values may be below the corresponding value using the P10a values as a new distribution. This might represent one of the worst-case scenarios that is a least likely outcome. 414 may correspond to taking a P40 of the P10t. 416 may correspond to taking a P90 of the P10t. 418 may correspond to taking a P10 of the P40t. 420 may correspond to taking a P40 of the P40t. 422 may correspond to taking a P90 of the P40t. 424 may correspond to taking a P10 of the P90t. 426 may correspond to taking a P40 of the P90t. 428 may correspond to taking a P90 of the P90t. For example, on the other end of the spectrum from the P10t, P10a, the 90t may represent that 90 percent of the values may be below the corresponding value, and the P90a of the P90t may represent that 90 percent of the values may be below the corresponding value using the P90a values as a new distribution. This might represent one of the best-case scenarios that is a least likely outcome.

430 may illustrate how interpolation uncertainty is incorporated into a probabilistic prediction of subsurface feature values. 432 may illustrate the interpolation error between control points in the subsurface volume of interest. 434 may illustrate the effect of subsurface parameters on the subsurface feature values. 432 and 434 may be combined as a function of position to more accurately estimate the uncertainty. The interpolation and reservoir/engineering importance (i.e., target subsurface parameters and corresponding weights) may be substantially similar to the estimated local geologic interpolation error discussed above.

436 may illustrate the probabilistic prediction distribution of subsurface feature values. 438 may illustrate a distribution of values used to estimate the subsurface feature values incorporating the uncertainty from 402, 410, and 430.

Figure 5:
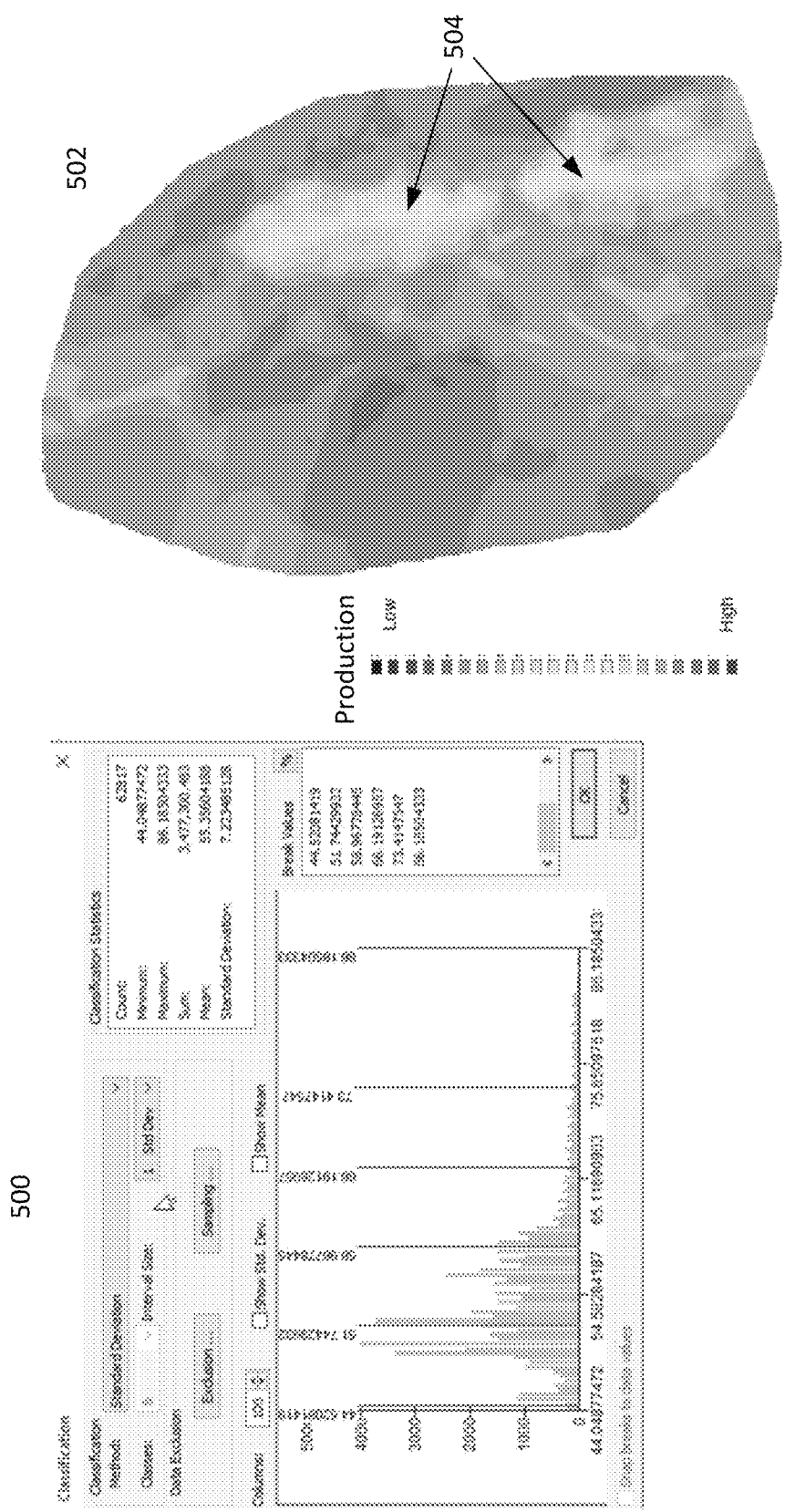
FIG. 5 illustrates an example representation of productivity.

FIG. 5 illustrates an example representation of productivity. Graphical user interface 500 may provide information for a subsurface volume of interest. For example, the count, minimum, maximum, sum, mean, and standard deviation may be displayed. The distribution of values may be illustrated in 500 as well. The subsurface data and well data used to generate the data in graphical user interface 500 may be used to generate representation 502 using a temperature map. Representation 502 may represent providing the productivity for P50 of the subsurface feature values.

Figure 6:
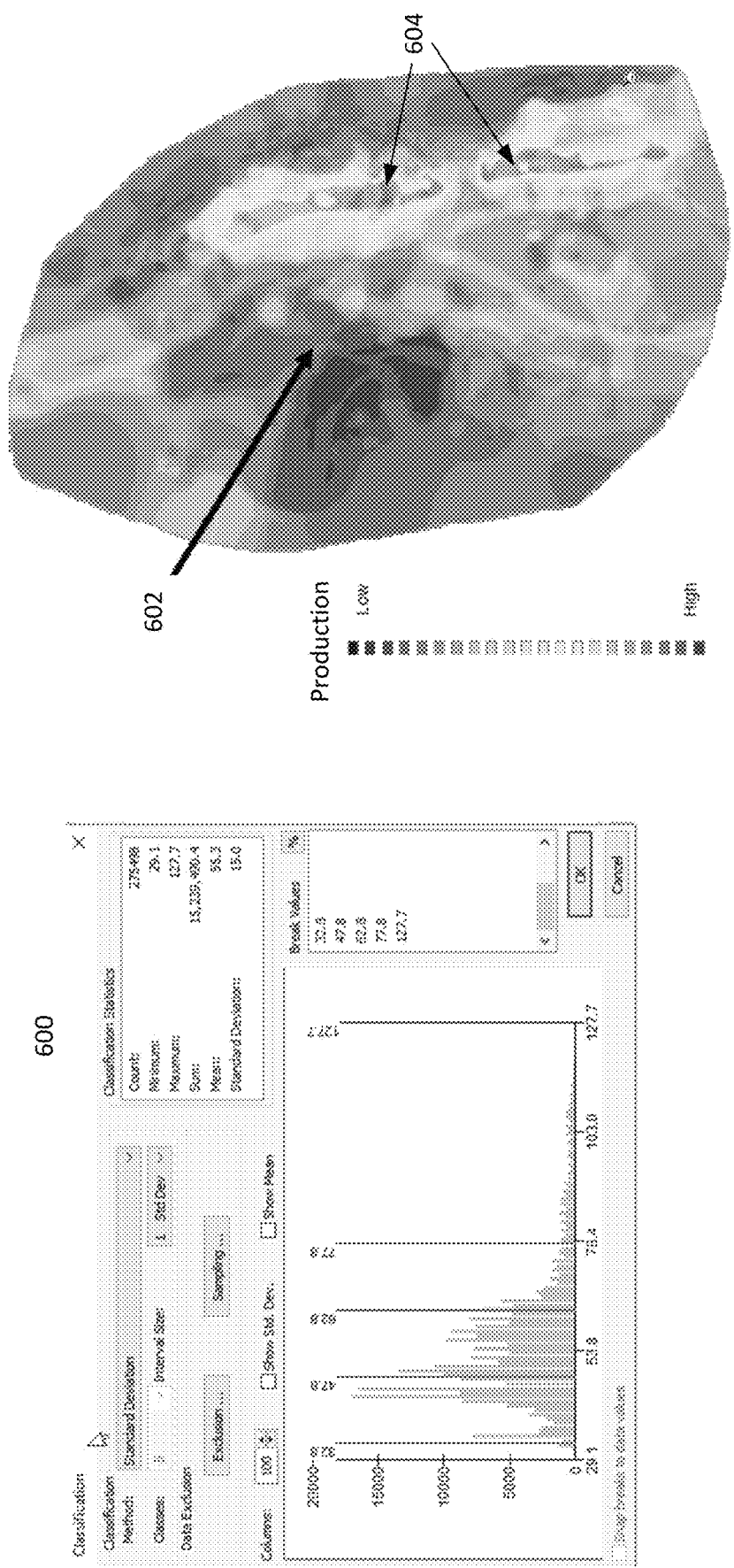
FIG. 6 illustrates an example representation of transforming productivity data, in accordance with some implementations.

FIG. 6 illustrates an example representation of transforming productivity data, in accordance with some implementations. Graphical user interface 600 may provide information for a subsurface volume of interest that is substantially similar to graphical user interface 500 of FIG. 5. Representation 602 may illustrate transformed subsurface feature values using a temperature map. The transformed subsurface feature values may be transformed using an arcsine transformation to widen the distribution for the subsurface volume of interest. The arcsine transformation may preserve the mean of the distribution but accentuate extreme cases and help make variances more constant throughout the subsurface volume of interest. For example, the arcsine transformation may be $Y(p)=\sin^{-1}(Z(p))$. For productivity, the transformation may be $$T_{prod} = \left\{\sin^{-1}\left(\frac{X-\mu}{\mu}\right) P_{orig} S_f\right\} + P_{orig}.$$

Regions 604 may help illustrate the effect the transformed subsurface feature values have on more easily identifying very high subsurface feature values compared to the rest of representation 602, especially compared to representation 502 in FIG. 5.

Figure 7:
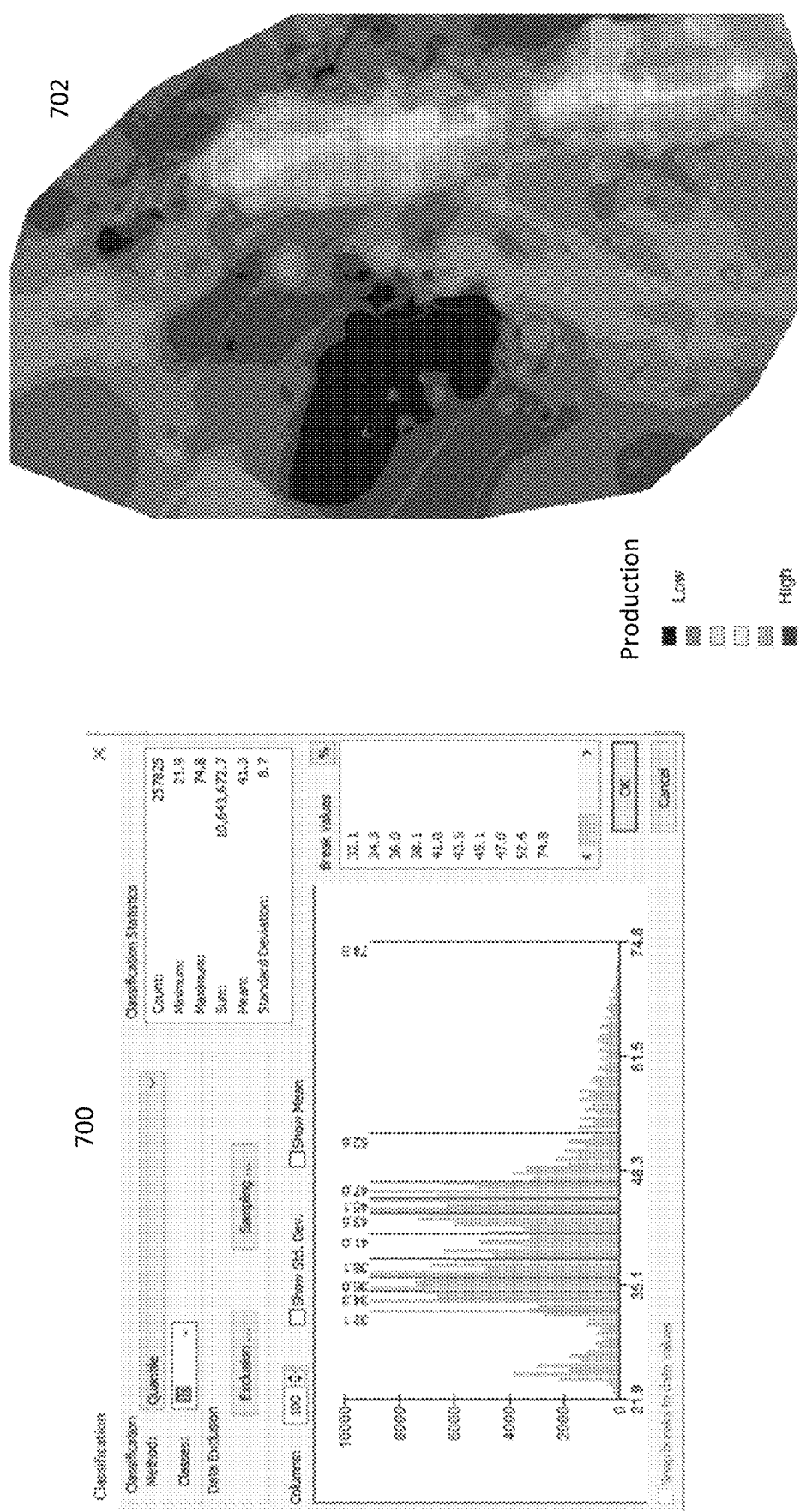
FIG. 7 illustrates an example representation of likelihoods of a subsurface feature, in accordance with some implementations.

FIG. 7 illustrates an example representation of likelihoods of a subsurface feature, in accordance with some implementations. Graphical user interface 700 and representation 702 may be substantially similar to graphical user interface 500 and representation 502. 702 may illustrate the P10 subsurface feature values. Regions 704 within representation 702 may represent higher subsurface feature values compared to the rest of representation 702.

Figure 8:
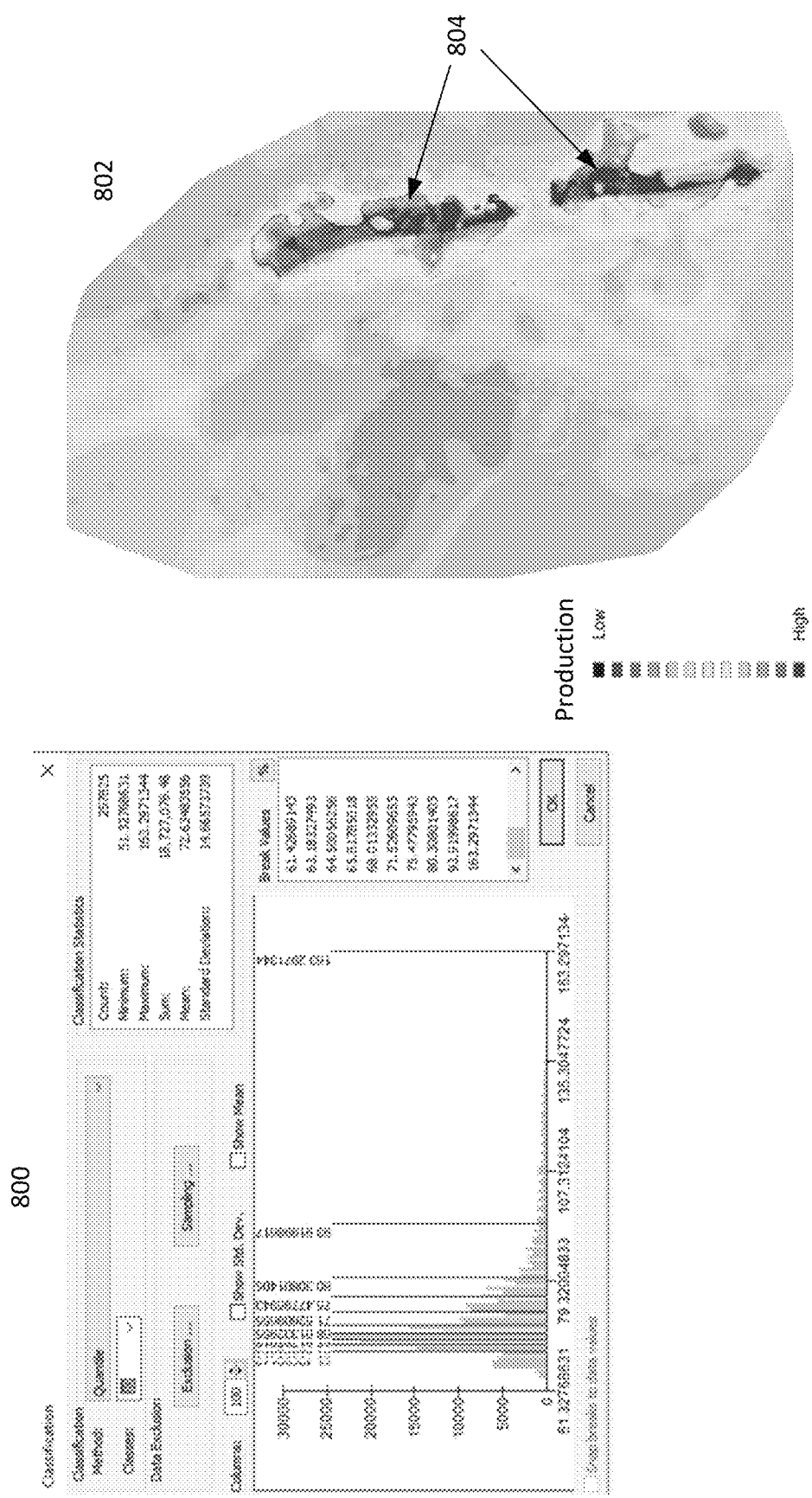
FIG. 8 illustrates an example representation of likelihoods of a subsurface feature, in accordance with some implementations.

FIG. 8 illustrates an example representation of likelihoods of a subsurface feature, in accordance with some implementations. Graphical user interface 800 and representation 802 may be substantially similar to graphical user interface 700 and representation 702. 802 may illustrate the P80 subsurface feature values. Regions 804 within representation 802 may represent higher subsurface feature values compared to the rest of representation 802.

Figure 9:
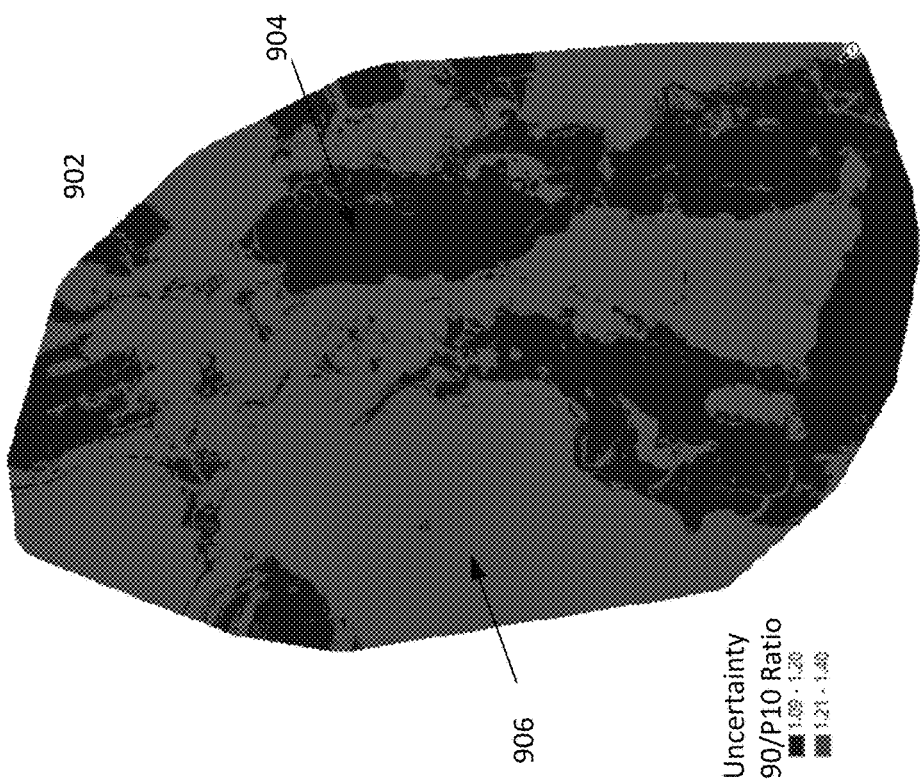
FIG. 9 illustrates an example representation of subsurface feature prediction probability distributions, in accordance with some implementations.
Figure 9:
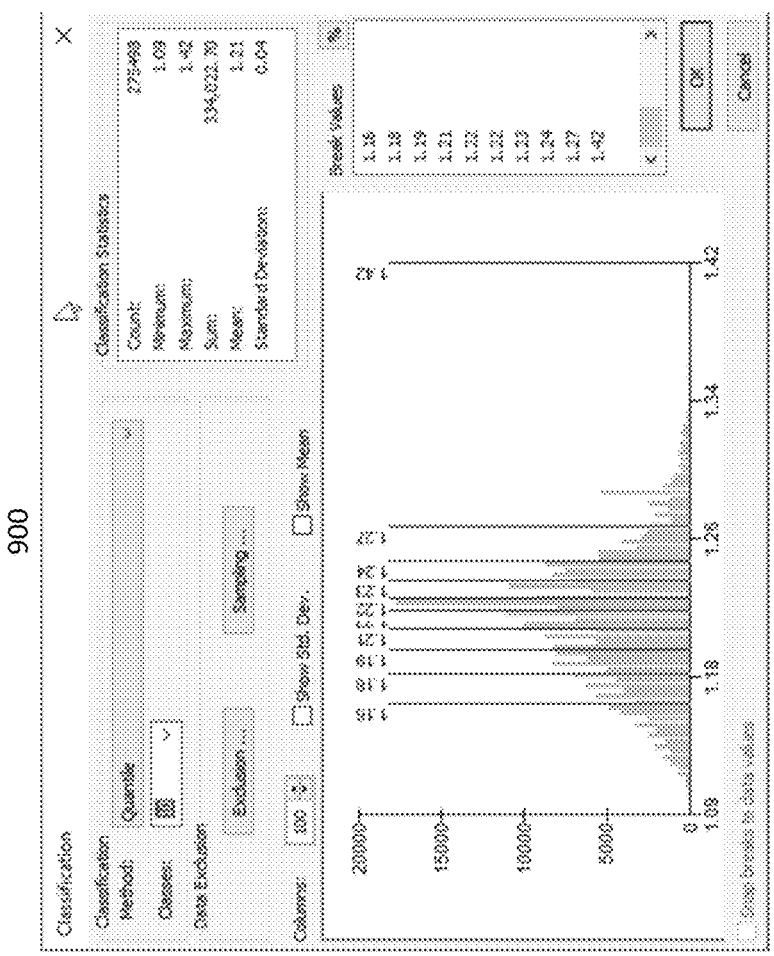

FIG. 9 illustrates example representation 902 of subsurface feature prediction probability distributions, in accordance with some implementations. Graphical user interface 900 and representation 902 may be substantially similar to graphical user interface 800 and representation 802. Representation 902 may illustrate an uncertainty of a subsurface feature realizations. Darker regions 904 may represent more accurate subsurface feature value estimates while brighter regions 906 may represent less accurate subsurface feature value estimates.

Figure 10:
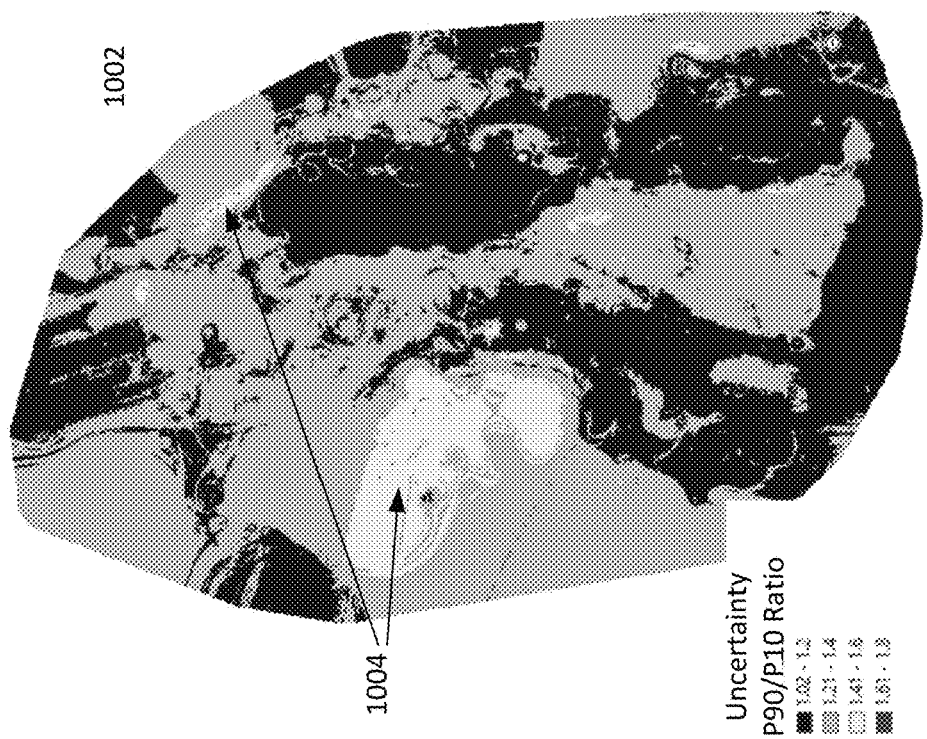
FIG. 10 illustrates an example representation of transformed subsurface feature prediction probability distributions, in accordance with some implementations.
Figure 10:
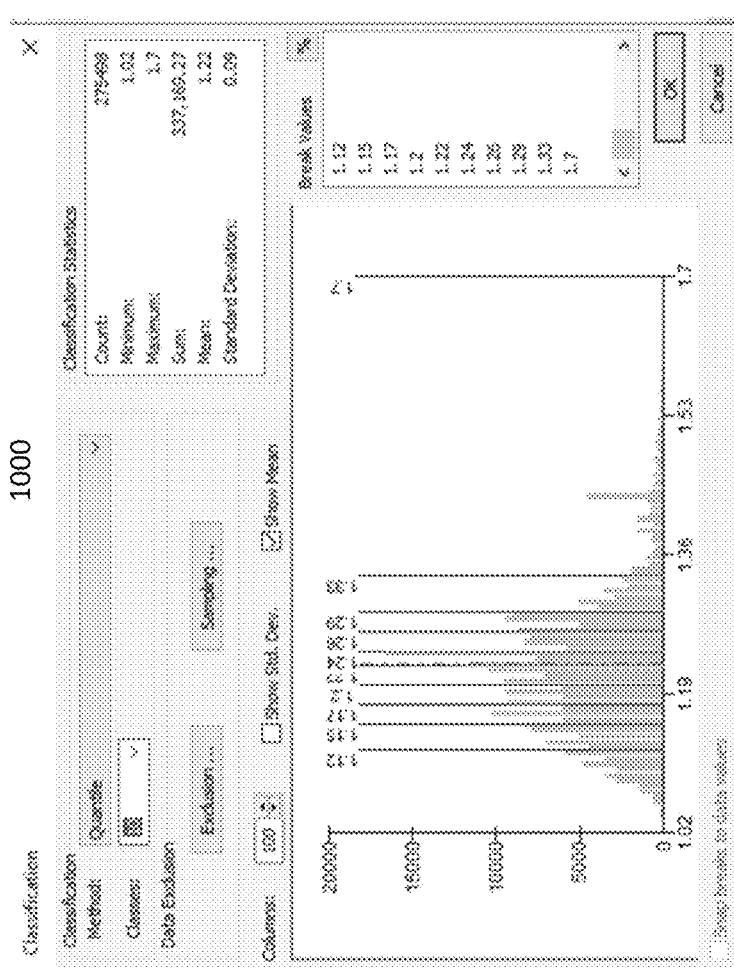

FIG. 10 illustrates an example representation of transformed subsurface feature prediction probability distributions, in accordance with some implementations. Graphical user interface 1000 and representation 1002 may be substantially similar to graphical user interface 900 and representation 902. Representation 1002 may illustrate an uncertainty of transformed subsurface feature realizations. While representation 1002 may be based on the same subsurface data and well data as representation 902, representation 1002 more clearly identifies region 1004 as being less accurate, or more uncertain, for subsurface feature values.

Figure 11:
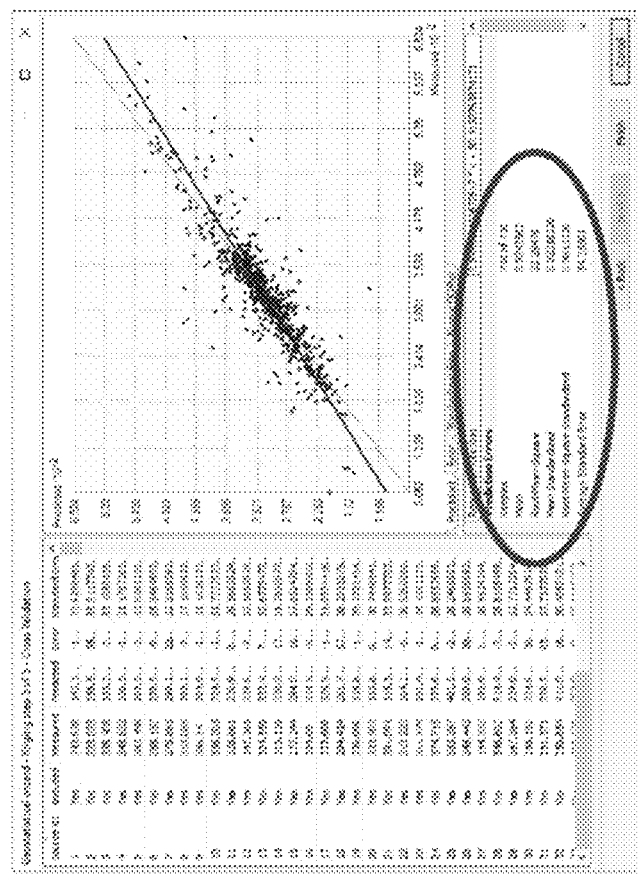
FIG. 11 illustrates an example representation of interpolation error between reservoir grid control points, in accordance with some implementations.

FIG. 11 illustrates an example representation of interpolation error between reservoir grid control points, in accordance with some implementations. Graphical user interface 1100 may illustrate interpolating values based on control points in the subsurface volume of interest. The control points may correspond to wells in the subsurface volume of interest. Interpolating subsurface feature values may include corresponding interpolation errors based, in part, on spatial distance from the control point. For example, the further away from a control point, the less accurate the interpolation may be. In another example, interpolation error may be high in the top left of representation 1102 because there are no control points nearby, whereas the regions near the control points have less errors because there are more control points near those areas and the values of interest are spatially-correlated.

Figure 12:
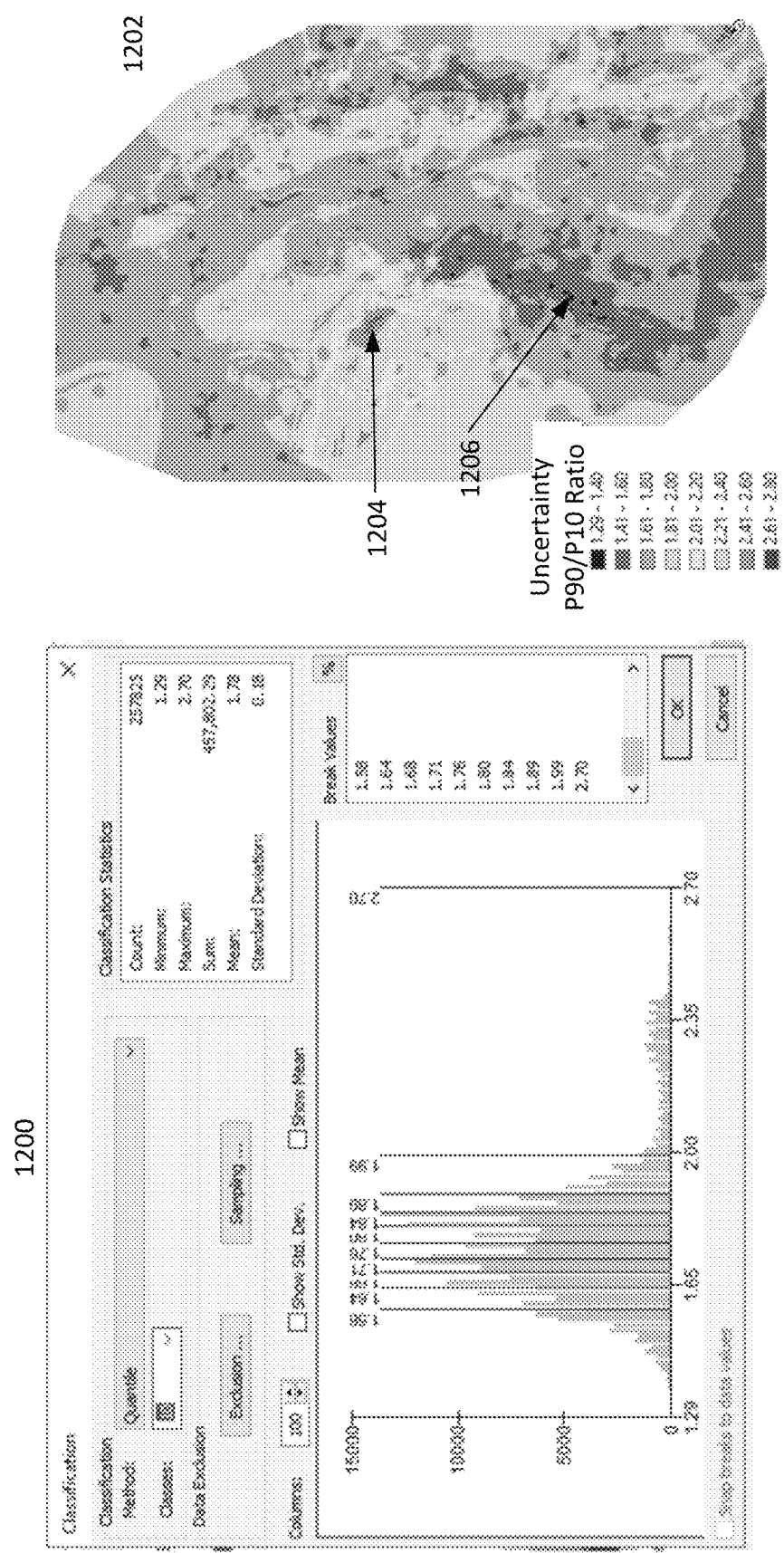
FIG. 12 illustrates an example representation of transformed subsurface feature prediction probability distributions including interpolation uncertainty, in accordance with some implementations.

FIG. 12 illustrates an example representation of transformed subsurface feature prediction probability distributions including interpolation uncertainty, in accordance with some implementations. Graphical user interface 1200 and representation 1202 may be substantially similar to graphical user interface 900 and representation 902. Representation 1202 may illustrate an uncertainty of transformed and interpolated subsurface feature realizations. The subsurface feature realization uncertainty, interpolation uncertainty, and subsurface parameter realization uncertainty are all incorporated into more accurately identifying regions that are more and less uncertain. For example, region 1204 may be the least accurate while darkest regions 1206 are the most accurate.

Figure 13:
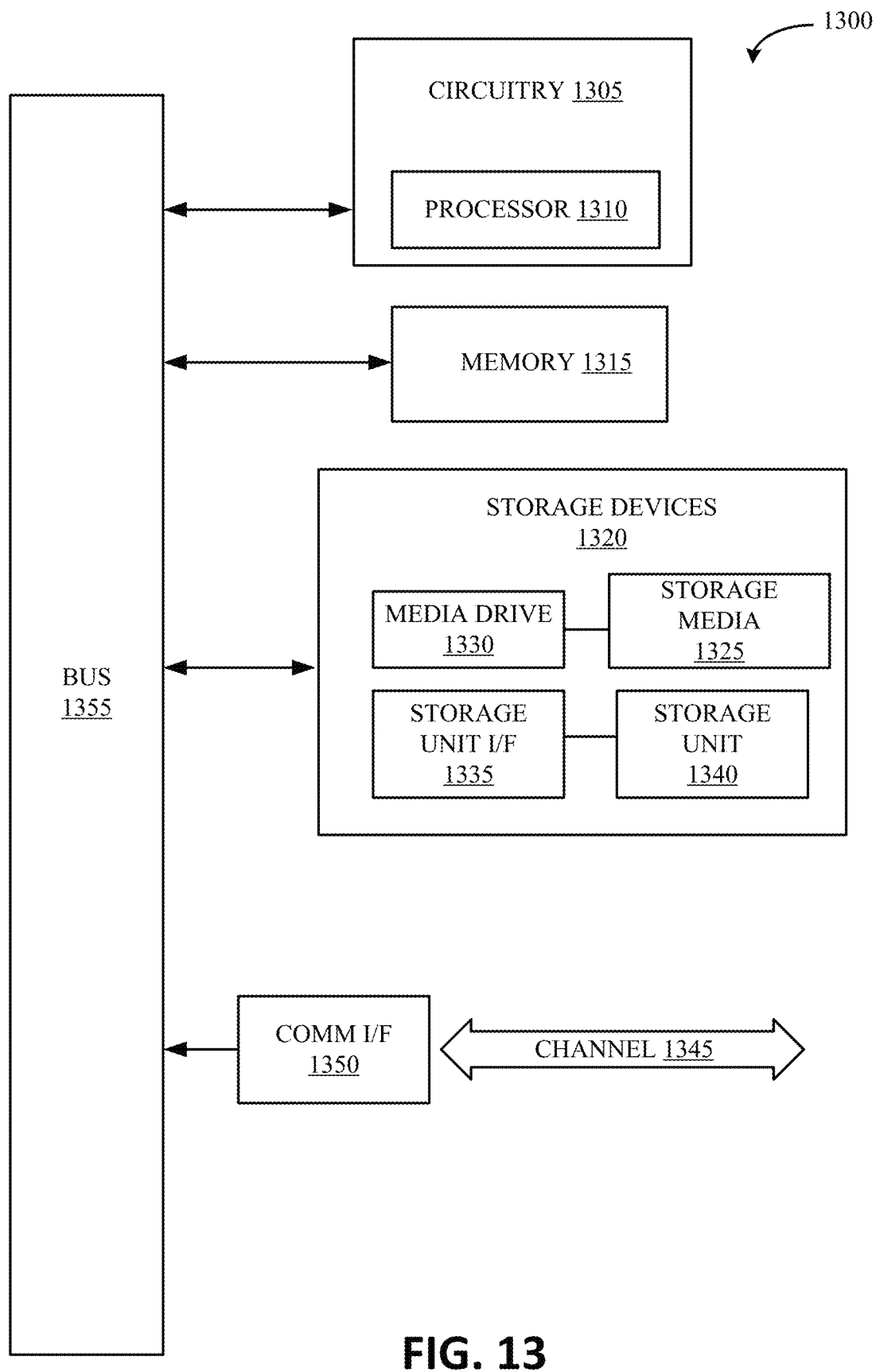
FIG. 13 illustrates example computing component, in accordance with some implementations.

FIG. 13 illustrates example computing component 1300, which may in some instances include a processor/controller resident on a computer system (e.g., server system 106). Computing component 1300 may be used to implement various features and/or functionality of implementations of the systems, devices, and methods disclosed herein. With regard to the above-described implementations set forth herein in the context of systems, devices, and methods described with reference to FIGS. 1 through 12, including implementations involving server(s) 102, it may be appreciated additional variations and details regarding the functionality of these implementations that may be carried out by computing component 1300. In this connection, it will also be appreciated upon studying the present disclosure that features and aspects of the various implementations (e.g., systems) described herein may be implemented with respect to other implementations (e.g., methods) described herein without departing from the spirit of the disclosure.

As used herein, the term component may describe a given unit of functionality that may be performed in accordance with some implementations of the present application. As used herein, a component may be implemented utilizing any form of hardware, software, or a combination thereof. For example, a processor, controller, ASIC, PLA, PAL, CPLD, FPGA, logical component, software routine, or other mechanism may be implemented to make up a component. In implementation, the various components described herein may be implemented as discrete components or the functions and features described may be shared in part or in total among components. In other words, it should be appreciated that after reading this description, the various features and functionality described herein may be implemented in any given application and may be implemented in separate or shared components in various combinations and permutations. Even though various features or elements of functionality may be individually described or claimed as separate components, it will be appreciated that upon studying the present disclosure that these features and functionality may be shared among a common software and hardware element, and such description shall not require or imply that separate hardware or software components are used to implement such features or functionality.

Where components of the application are implemented in whole or in part using software, in implementations, these software elements may be implemented to operate with a computing or processing component capable of carrying out the functionality described with respect thereto. One such example computing component is shown in FIG. 13. Various implementations are described in terms of example computing component 1300. After reading this description, it will be appreciated how to implement example configurations described herein using other computing components or architectures.

Referring now to FIG. 13, computing component 1300 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 1300 is specifically purposed.

Computing component 1300 may include, for example, a processor, controller, control component, or other processing device, such as a processor 1310, and such as may be included in circuitry 1305. Processor 1310 may be implemented using a special-purpose processing engine such as, for example, a microprocessor, controller, or other control logic. In the illustrated example, processor 1310 is connected to bus 1355 by way of circuitry 1305, although any communication medium may be used to facilitate interaction with other components of computing component 1300 or to communicate externally.

Computing component 1300 may also include a memory component, simply referred to herein as main memory 1315. For example, random access memory (RAM) or other dynamic memory may be used for storing information and instructions to be executed by processor 1310 or circuitry 1305. Main memory 1315 may also be used for storing temporary variables or other intermediate information during execution of instructions to be executed by processor 1310 or circuitry 1305. Computing component 1300 may likewise include a read only memory (ROM) or other static storage device coupled to bus 1355 for storing static information and instructions for processor 1310 or circuitry 1305.

Computing component 1300 may also include various forms of information storage devices 1320, which may include, for example, media drive 1330 and storage unit interface 1335. Media drive 1330 may include a drive or other mechanism to support fixed or removable storage media 1325. For example, a hard disk drive, a floppy disk drive, a magnetic tape drive, an optical disk drive, a CD or DVD drive (R or RW), or other removable or fixed media drive may be provided. Accordingly, removable storage media 1325 may include, for example, a hard disk, a floppy disk, magnetic tape, cartridge, optical disk, a CD or DVD, or other fixed or removable medium that is read by, written to, or accessed by media drive 1330. As these examples illustrate, removable storage media 1325 may include a computer usable storage medium having stored therein computer software or data.

In alternative implementations, information storage devices 1320 may include other similar instrumentalities for allowing computer programs or other instructions or data to be loaded into computing component 1300. Such instrumentalities may include, for example, fixed or removable storage unit 1340 and storage unit interface 1335. Examples of such removable storage units 1340 and storage unit interfaces 1335 may include a program cartridge and cartridge interface, a removable memory (for example, a flash memory or other removable memory component) and memory slot, a PCMCIA slot and card, and other fixed or removable storage units 1340 and storage unit interfaces 1335 that allow software and data to be transferred from removable storage unit 1340 to computing component 1300.

Computing component 1300 may also include a communications interface 1350. Communications interface 1350 may be used to allow software and data to be transferred between computing component 1300 and external devices. Examples of communications interface 1350 include a modem or softmodem, a network interface (such as an Ethernet, network interface card, WiMedia, IEEE 1302.XX, or other interface), a communications port (such as for example, a USB port, IR port, RS232 port Bluetooth® interface, or other port), or other communications interface. Software and data transferred via communications interface 1350 may typically be carried on signals, which may be electronic, electromagnetic (which includes optical) or other signals capable of being exchanged by a given communications interface 1350. These signals may be provided to/from communications interface 1350 via channel 1345. Channel 1345 may carry signals and may be implemented using a wired or wireless communication medium. Some non-limiting examples of channel 1345 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 1315, storage unit interface 1335, removable storage media 1325, and channel 1345. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 1300 or a processor to perform features or functions of the present application as discussed herein.

Various implementations have been described with reference to specific example features thereof. It will, however, be evident that various modifications and changes may be made thereto without departing from the broader spirit and scope of the various implementations as set forth in the appended claims. The specification and figures are, accordingly, to be regarded in an illustrative rather than a restrictive sense.

Although described above in terms of various example implementations and implementations, it should be understood that the various features, aspects, and functionality described in one of the individual implementations are not limited in their applicability to the particular implementation with which they are described, but instead may be applied, alone or in various combinations, to other implementations of the present application, whether or not such implementations are described and whether or not such features are presented as being a part of a described implementation. Thus, the breadth and scope of the present application should not be limited by any of the above-described example implementations.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various implementations set forth herein are described in terms of example block diagrams, flow charts, and other illustrations. As will be appreciated after reading this document, the illustrated implementations and their various alternatives may be implemented without confinement to the illustrated examples. For example, block diagrams and their accompanying description should not be construed as mandating a particular architecture or configuration.

What is claimed is:

1. A computer-implemented method for generating subsurface feature prediction probability distributions from a subsurface feature as a function of position in a subsurface volume of interest, the method being implemented in a computer system that comprises a physical computer processor, non-transient electronic storage, and a graphical user interface, the method comprising:
   obtaining, from the non-transient electronic storage, subsurface data and well data;
   generating, with the physical computer processor, subsurface feature values as the function of position in the subsurface volume of interest based on a subsurface feature relationship between the subsurface data and the well data;
   generating, with the physical computer processor, subsurface feature realizations based on the subsurface feature values;
   generating, with the physical computer processor, subsurface feature realization uncertainty values corresponding to the subsurface feature realizations, wherein the subsurface feature realization uncertainty values are based on the subsurface feature relationship;
   generating, with the physical computer processor, subsurface parameter values indicating effects of subsurface parameters on individual ones of the subsurface feature values based on subsurface parameter relationships between the subsurface parameters and corresponding ones of the subsurface feature values;
   generating, with the physical computer processor, subsurface parameter realizations based on the subsurface feature realizations and the subsurface parameter values;
   generating, with the physical computer processor, subsurface parameter realization uncertainty values corresponding to the subsurface parameter realizations, wherein the subsurface parameter realization uncertainty values are based on the subsurface parameter relationships;
   generating, with the physical computer processor, the subsurface feature prediction probability distributions as the function of position in the subsurface volume of interest based on the subsurface feature values, the subsurface feature realizations and corresponding ones of the subsurface feature realization uncertainty values, the subsurface parameter values, and the subsurface parameter realizations and corresponding ones of the subsurface parameter realization uncertainty values;
   generating, with the physical computer processor, a first representation of likelihoods of the subsurface feature values as the function of position in the subsurface volume of interest using visual effects to display at least some of the subsurface feature prediction probability distributions as the function of position in the subsurface volume of interest;
   generating, with the physical computer processor, interpolation uncertainty values based on a sum of interpolation errors, wherein the interpolation errors are based on interpolating the subsurface feature values;
   generating, with the physical computer processor, a second representation of the likelihoods of the subsurface feature values as the function of position in the subsurface volume of interest using visual effects to display at least some interpolated subsurface feature prediction probability distributions as the function of position in the subsurface volume of interest; and
   displaying the first representation and the second representation on the graphical user interface.

2. The computer-implemented method of claim 1, further comprising:
   generating, with the physical computer processor, interpolated subsurface feature prediction probability distributions as the function of position in the subsurface volume of interest based on the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values.

3. The computer-implemented method of claim 1, wherein the subsurface feature comprises estimated ultimate recovery, and wherein estimated ultimate recovery values are generated by applying decline analysis to the subsurface data and the well data.

4. The computer-implemented method of claim 1, wherein the subsurface feature realizations comprise different statistical confidence levels based on the subsurface feature values, and wherein the subsurface parameter realizations comprise different statistical confidence levels based on the subsurface feature values and individual ones of the subsurface feature realizations.

5. The computer-implemented method of claim 1, wherein the subsurface feature realizations comprise P7, P10, P33, P50, P66, P90, and P95 based on the subsurface feature values, and wherein the subsurface parameter realizations comprise P7, P10, P33, P50, P66, P90, and P95 for individual ones of the subsurface feature realizations based on the subsurface feature values.

6. The computer-implemented method of claim 1, wherein individual ones of the subsurface feature prediction probability distributions specify likelihoods of the subsurface feature values as the function of position in the subsurface volume of interest.

7. The computer-implemented method of claim 1, wherein the subsurface feature relationship comprises a decline analysis that estimates future production rates.

8. The computer-implemented method of claim 1, wherein the subsurface feature prediction probability distributions are generated by:
   generating parameter matrices for the subsurface feature realizations by correlating the subsurface parameter realizations for individual ones of the subsurface parameters with corresponding positions in the subsurface volume of interest and corresponding ones of the subsurface feature realizations, and wherein an element in individual ones of the parameter matrices comprise the subsurface parameter realizations for a subsurface parameter of the subsurface parameters; and
   generating the subsurface feature prediction probability distributions based on the parameter matrices, the subsurface feature values, the subsurface feature realizations and corresponding ones of the subsurface feature realization uncertainty values, the subsurface parameter values, the subsurface parameter realizations and corresponding ones of the subsurface parameter realization uncertainty values.

9. The computer-implemented method of claim 8, further comprising weighting individual ones of the parameter matrices based on individual effects of the subsurface parameters on the subsurface feature.

10. The computer-implemented method of claim 1, wherein the subsurface parameter values are generated by:
obtaining the subsurface parameter relationships, wherein the subsurface parameter relationships have been conditioned by training initial subsurface parameter relationships using training well data and training subsurface parameter values; and
generating the subsurface parameter values by applying the subsurface parameter relationships to the subsurface data and the well data.

11. A system comprising:
a display;
non-transient electronic storage; and
a physical computer processor configured by machine-readable instructions to:
obtain subsurface data and well data;
generate subsurface feature values as a function of position in the subsurface volume of interest based on a subsurface feature relationship between the subsurface data and the well data;
generate subsurface feature realizations based on the subsurface feature values;
generate subsurface feature realization uncertainty values corresponding to the subsurface feature realizations, wherein the subsurface feature realization uncertainty values are based on the subsurface feature relationship;
generate subsurface parameter values indicating effects of subsurface parameters on individual ones of the subsurface feature values based on subsurface parameter relationships between the subsurface parameters and corresponding ones of the subsurface feature values;
generate subsurface parameter realizations based on the subsurface feature realizations and the subsurface parameter values;
generate subsurface parameter realization uncertainty values corresponding to the subsurface parameter realizations, wherein the subsurface parameter realization uncertainty values are based on the subsurface parameter relationships;
generate the subsurface feature prediction probability distributions as the function of position in the subsurface volume of interest based on the subsurface feature values, the subsurface feature realizations and corresponding ones of the subsurface feature realization uncertainty values, the subsurface parameter values, and the subsurface parameter realizations and corresponding ones of the subsurface parameter realization uncertainty values;
generate a first representation of likelihoods of the subsurface feature values as the function of position in the subsurface volume of interest using visual effects to display at least some of the subsurface feature prediction probability distributions as the function of position in the subsurface volume of interest;
generate interpolation uncertainty values based on a sum of interpolation errors, wherein the interpolation errors are based on interpolating the subsurface feature values;
generate a second representation of the likelihoods of the subsurface feature values as the function of position in the subsurface volume of interest using visual effects to display at least some interpolated subsurface feature prediction probability distributions as the function of position in the subsurface volume of interest; and
display the first representation and the second representation.

12. The system of claim 11, wherein the physical computer processor is further configured by machine-readable instructions to:
generate interpolated subsurface feature prediction probability distributions as the function of position in the subsurface volume of interest based on the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values.

13. The system of claim 11, wherein the subsurface feature realizations comprise different statistical confidence levels based on the subsurface feature values, and wherein the subsurface parameter realizations comprise different statistical confidence levels based on the subsurface feature values and individual ones of the subsurface feature realizations.

14. The system of claim 11, wherein the subsurface feature realizations comprise P7, P10, P33, P50, P66, P90, and P95 based on the subsurface feature values, and wherein the subsurface parameter realizations comprise P7, P10, P33, P50, P66, P90, and P95 for individual ones of the subsurface feature realizations based on the subsurface feature values.

15. The system of claim 11, wherein the subsurface feature prediction probability distributions are generated by:
generating parameter matrices for the subsurface feature realizations by correlating the subsurface parameter realizations for individual ones of the subsurface parameters with corresponding positions in the subsurface volume of interest and corresponding ones of the subsurface feature realizations, and wherein an element in individual ones of the parameter matrices comprise the subsurface parameter realizations for a subsurface parameter of the subsurface parameters; and
generating the subsurface feature prediction probability distributions based on the parameter matrices, the subsurface feature values, the subsurface feature realizations and corresponding ones of the subsurface feature realization uncertainty values, the subsurface parameter values, the subsurface parameter realizations and corresponding ones of the subsurface parameter realization uncertainty values.

16. The system of claim 11, wherein the subsurface parameter values are generated by:
obtaining the subsurface parameter relationships, wherein the subsurface parameter relationships have been conditioned by training initial subsurface parameter relationships using training well data and training subsurface parameter values; and
generating the subsurface parameter values by applying the subsurface parameter relationships to the subsurface data and the well data.

17. A non-transitory machine-readable storage media storing instructions that, when executed by a physical computer processor, cause the physical computer processor to:
obtain subsurface data and well data;

generate subsurface feature values as a function of position in the subsurface volume of interest based on a subsurface feature relationship between the subsurface data and the well data;

generate subsurface feature realizations based on the subsurface feature values;

generate subsurface feature realization uncertainty values corresponding to the subsurface feature realizations, wherein the subsurface feature realization uncertainty values are based on the subsurface feature relationship;

generate subsurface parameter values indicating effects of subsurface parameters on individual ones of the subsurface feature values based on subsurface parameter relationships between the subsurface parameters and corresponding ones of the subsurface feature values;

generate subsurface parameter realizations based on the subsurface feature realizations and the subsurface parameter values;

generate subsurface parameter realization uncertainty values corresponding to the subsurface parameter realizations, wherein the subsurface parameter realization uncertainty values are based on the subsurface parameter relationships;

generate the subsurface feature prediction probability distributions as the function of position in the subsurface volume of interest based on the subsurface feature values, the subsurface feature realizations and corresponding ones of the subsurface feature realization uncertainty values, the subsurface parameter values, and the subsurface parameter realizations and corresponding ones of the subsurface parameter realization uncertainty values;

generate a first representation of likelihoods of the subsurface feature values as the function of position in the subsurface volume of interest using visual effects to display at least some of the subsurface feature prediction probability distributions as the function of position in the subsurface volume of interest;

generate interpolation uncertainty values based on a sum of interpolation errors, wherein the interpolation errors are based on interpolating the subsurface feature values;

generate a second representation of the likelihoods of the subsurface feature values as the function of position in the subsurface volume of interest using visual effects to display at least some interpolated subsurface feature prediction probability distributions as the function of position in the subsurface volume of interest; and display the first representation and the second representation.

18. The non-transitory machine-readable storage media of claim 17, wherein the non-transitory machine-readable storage media stores further instructions that, when executed by the physical computer processor, causes the physical computer processor to:

generate interpolated subsurface feature prediction probability distributions as the function of position in the subsurface volume of interest based on the subsurface feature values, the subsurface feature realizations and corresponding ones of the subsurface feature realization uncertainty values, the subsurface parameter values, the subsurface parameter realizations and corresponding ones of the subsurface parameter realization uncertainty values, and the interpolation uncertainty values.

19. The non-transitory machine-readable storage media of claim 17, wherein the subsurface feature realizations comprise P7, P10, P33, P50, P66, P90, and P95 based on the subsurface feature values, and wherein the subsurface parameter realizations comprise P7, P10, P33, P50, P66, P90, and P95 for individual ones of the subsurface feature realizations based on the subsurface feature values.

* * * * *